US009357431B2

(12) United States Patent
Paladugu et al.

(10) Patent No.: US 9,357,431 B2
(45) Date of Patent: May 31, 2016

(54) SELECTIVE NETWORK PARAMETER CONFIGURATONS BASED ON NETWORK IDENTIFICATION OF NON-IMS MULTIMEDIA APPLICATIONS

(71) Applicant: QUALCOMM Incorporated, San Diego, CA (US)

(72) Inventors: Karthika Paladugu, San Diego, CA (US); Kirankumar Anchan, San Diego, CA (US); Arvind V. Santhanam, San diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 192 days.

(21) Appl. No.: 14/012,995

(22) Filed: Aug. 28, 2013

(65) Prior Publication Data
US 2014/0064156 A1  Mar. 6, 2014

Related U.S. Application Data

(60) Provisional application No. 61/695,726, filed on Aug. 31, 2012.

(51) Int. Cl.
*H04W 28/02* (2009.01)
*H04W 36/00* (2009.01)

(52) U.S. Cl.
CPC ...... *H04W 28/0268* (2013.01); *H04W 36/0022* (2013.01)

(58) Field of Classification Search
USPC .......................................................... 370/259
See application file for complete search history.

(56) References Cited

U.S. PATENT DOCUMENTS

2006/0029096 A1* 2/2006 Babbar ................. H04W 28/24
370/466
2009/0196170 A1* 8/2009 Ayyagari et al. ............. 370/221

(Continued)

FOREIGN PATENT DOCUMENTS

EP  2375812 A2  10/2011
WO  2009152099  12/2009

OTHER PUBLICATIONS

3GPP: "3rd Generation Partnership Project; Technical Specification Group Services and System Aspects; Architectural Enhancements for End-to-End Quality of Service (QoS) (Release 7)", 3GPP Draft; 23802-V2.0.0, 3rd Generation Partnership Project (3GPP), Mobile Competence Centre; 650, Route Des Lucioles; F-06921 Sophia-Antipolis Cedex; France, vol. TSG SA, no. Tallinn, Estonia; Sep. 20, 2005, XP050205626, pp. 1-58.

(Continued)

*Primary Examiner* — Robert M Morlan
(74) *Attorney, Agent, or Firm* — Muncy, Geissler, Olds & Lowe, P.C.

(57) ABSTRACT

In a first embodiment, an access network detects whether QoS links for both IMS and non-IMS sessions are allocated to a client device, whereby the non-IMS session is recognized as being associated with a particular application type. An SRVCC feature for the IMS session is disabled if the QoS link for the non-IMS session exists and carries at least a threshold level of traffic. In a second embodiment, a non-IMS session is supported by a first network with QoS and is then handed off to a second network. After the handoff, the second network supports the non-IMS session with an application-specific QoS configuration based on application-identifying information provided from the first network. In a third embodiment, a single or dual-transceiver client device is engaged in a non-IMS session with QoS. A page originating from a CS network is ignored if a do-not-disturb feature is activated for the non-IMS session.

50 Claims, 19 Drawing Sheets

(56) References Cited

U.S. PATENT DOCUMENTS

| | | | |
|---|---|---|---|
| 2009/0258671 | A1 | 10/2009 | Kekki et al. |
| 2010/0040020 | A1 | 2/2010 | Chen |
| 2010/0074109 | A1* | 3/2010 | Klingenbrunn et al. ...... 370/230 |
| 2011/0090873 | A1 | 4/2011 | Lee et al. |
| 2011/0103277 | A1 | 5/2011 | Watfa et al. |
| 2011/0310851 | A1* | 12/2011 | Klingenbrunn et al. ...... 370/332 |
| 2011/0317673 | A1 | 12/2011 | Shelby |
| 2012/0034910 | A1 | 2/2012 | Fang et al. |
| 2012/0076109 | A1 | 3/2012 | Lindholm et al. |
| 2012/0093086 | A1* | 4/2012 | Yin et al. ...................... 370/328 |
| 2012/0195261 | A1 | 8/2012 | Nishida et al. |
| 2013/0299559 | A1 | 11/2013 | Luechinger et al. |
| 2014/0140324 | A1* | 5/2014 | Stenfelt et al. ................ 370/331 |

OTHER PUBLICATIONS

Alcatel-Lucent et al., "PS speech service incompatible with SRVCC", 3GPP Draft; S2-110625__23216R9__UE__SRVCC Capability Change V4, 3rd Generation Partnership Project (3GPP), Mobile Competence Centre ; 650, Route Des Lucjoles, F-06921 Sophia-Antipolis Cedex ; France, vol. SA WG2, no. Salt Lake City; 20110221, Feb. 15, 2011, XP050523821, pp. 1-4.
Ericsson: "ARP priority level values in intra-operator domain", 3GPP Draft; C3_54__19BIS__ARP__INTRA__213__832__1051, C3-091052, 3rd Generation Partnership Project (3GPP), Mobile Competence Centre ; 650, Route Des Lucioles ; F-06921 Sophia-Antipolis Cedex ; France, vol. CT WG3, no. Seville; Aug. 24, 2009, Aug. 28, 2009, XP050445265, pp. 1-8.
Huawei: "Alternative SIRIG solution", 3GPP Draft; S2AH-Huawei-Alternative SIRIG Solution, 3rd Generation Partnership Project (3GPP), Mobile Competence Centre, 650, Route Des Lucioles; F-06921 Sophia-Antipolis Cedex; France, vol. SA WG2, no. Conference Call, May 7, 2012, XP050632415, pp. 1-2.
International Search Report and Written Opinion—PCT/US2013/057414—ISAEPO—Mar. 20, 2014.
Motorola: "Additon of UE behavior when QCI value modified by network", 3GPP Draft; C1-090465, 3rd Generation Partnership Project (3GPP), Mobile Competence Centre ; 650, Route Des Lucioles ; F-06921 Sophia-Antipolis Cedex ; France, no. San Antonio; 20090224, Feb. 24, 2009, XP050310910, pp. 1-6.
Nokia: "SBLP Decisions", 3GPP Draft; N3-040498, 3rd Generation Partnership Project (3GPP), Mobile Competence Centre ; 650, Route Des Lucioles ; F-06921 Sophia-Antipolis Cedex ; France, vol. CN WG3, no. Sophia Antipolis, France; 20040820, Aug. 20, 2004, XP050077060, pp. 1-6.
Nokia Siemens Networks et al., "Separate procedure for Inter-RAT load status update", 3GPP Draft; R3-091922, 3rd Generation Partnership Project (3GPP), Mobile Competence Centre; 650, Route Des Lucioles ; F-06921 Sophia-Antipolis Cedex; France, no. Shenzhen, China; Aug. 20, 2009, XP050353281, pp. 1-6.
Rossi M., et al., "On the delay statistics of an aggregate of SR-ARQ packets over Markov channels with finite round-trip delay", 2003 IEEE Wireless Communications and Networking Conference Record; March 16-20, 2003, New Orleans, Louisiana, USA, IEEE Operations Center, Piscataway, NJ, vol. 3, Mar. 16, 2003, pp. 1773-1778, XP010640038, DOI: 10.1109/WCNC.2003.1200655 ISBN: 978-0-7803-7700-4.
Samsung Electronics: "SRVCC=Single Radio Video Call Continuity Samsung Electronics", 3GPP Draft; S2-096804, 3rd Generation Partnership Project (3GPP), Mobile Competence Centre ; 650, Route Des Lucioles ; F-06921 Sophia-Antipolis Cedex; France, vol. SA WG2, no. San Jose del Cabo, Nov. 10, 2009, XP050630299, p. 1-13.
ZTE: "Correction of the PDN connectivity procedure", 3GPP Draft; S2-093830 Correct the PDN Connectivity Procedure for R9, 3rd Generation Partnership-Project (3GPP), Mobile Competence Centre; 650, Route Des Lucioles; F-06921 Sophia-Antipolis Cedex; France, no. Tallinn; 20090514, May 14, 2009, XP050346848, pp. 1-10.
3GPP TR 23.802 V2.0.0 (Sep. 2005), (Release 7), 3rd Generation Partnership Project, Technical Specification Group Services and System Aspects, Architectural Enhancements for End-to-End Quality of Service (QoS).

* cited by examiner

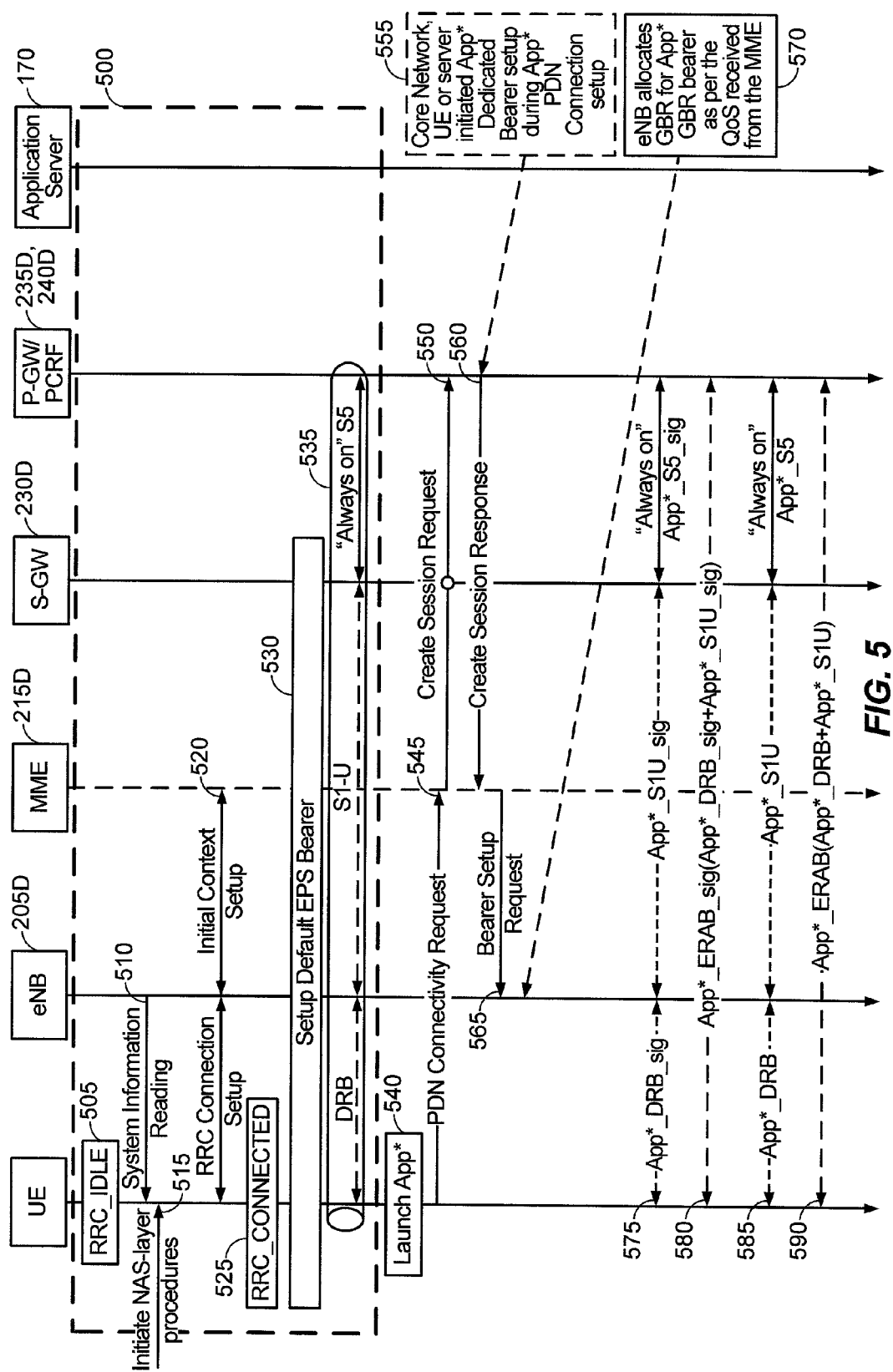

SELECTIVE NETWORK PARAMETER CONFIGURATONS BASED ON NETWORK IDENTIFICATION OF NON-IMS MULTIMEDIA APPLICATIONS

CLAIM OF PRIORITY UNDER 35 U.S.C. §119

The present application for patent claims priority to Provisional Application No. 61/695,726, entitled "SELECTIVE NETWORK PARAMETER CONFIGURATIONS BASED ON NETWORK IDENTIFICATION OF NON-IMS VOIP APPLICATIONS", filed Aug. 31, 2012, by the same inventors as the subject application, assigned to the assignee hereof and hereby expressly incorporated by reference herein in its entirety.

BACKGROUND OF THE INVENTION

1. Field of the Invention

Embodiments of the invention relate to selective network parameter configurations based on network identification of non Internet Protocol (IP) Multimedia Subsystem (IMS) multimedia applications.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

SUMMARY

In a first embodiment, an access network detects whether QoS links for both IMS and non-IMS sessions are allocated to a client device, whereby the non-IMS session is recognized as being associated with a particular application type. An SRVCC feature for the IMS session is disabled if the QoS link for the non-IMS session exists and carries at least a threshold level of traffic. In a second embodiment, a non-IMS session is supported by a first network with QoS and is then handed off to a second network. After the handoff, the second network supports the non-IMS session with an application-specific QoS configuration based on application-identifying information provided from the first network. In a third embodiment, a single or dual-transceiver client device is engaged in a non-IMS session with QoS. A page originating from a CS network is ignored if a do-not-disturb feature is activated for the non-IMS session.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 5 illustrates an 'Always On' Quality of Service (QoS) setup procedure for a particular Guaranteed Bit Rate (GBR) EPS bearer.

DETAILED DESCRIPTION

Figure 1:
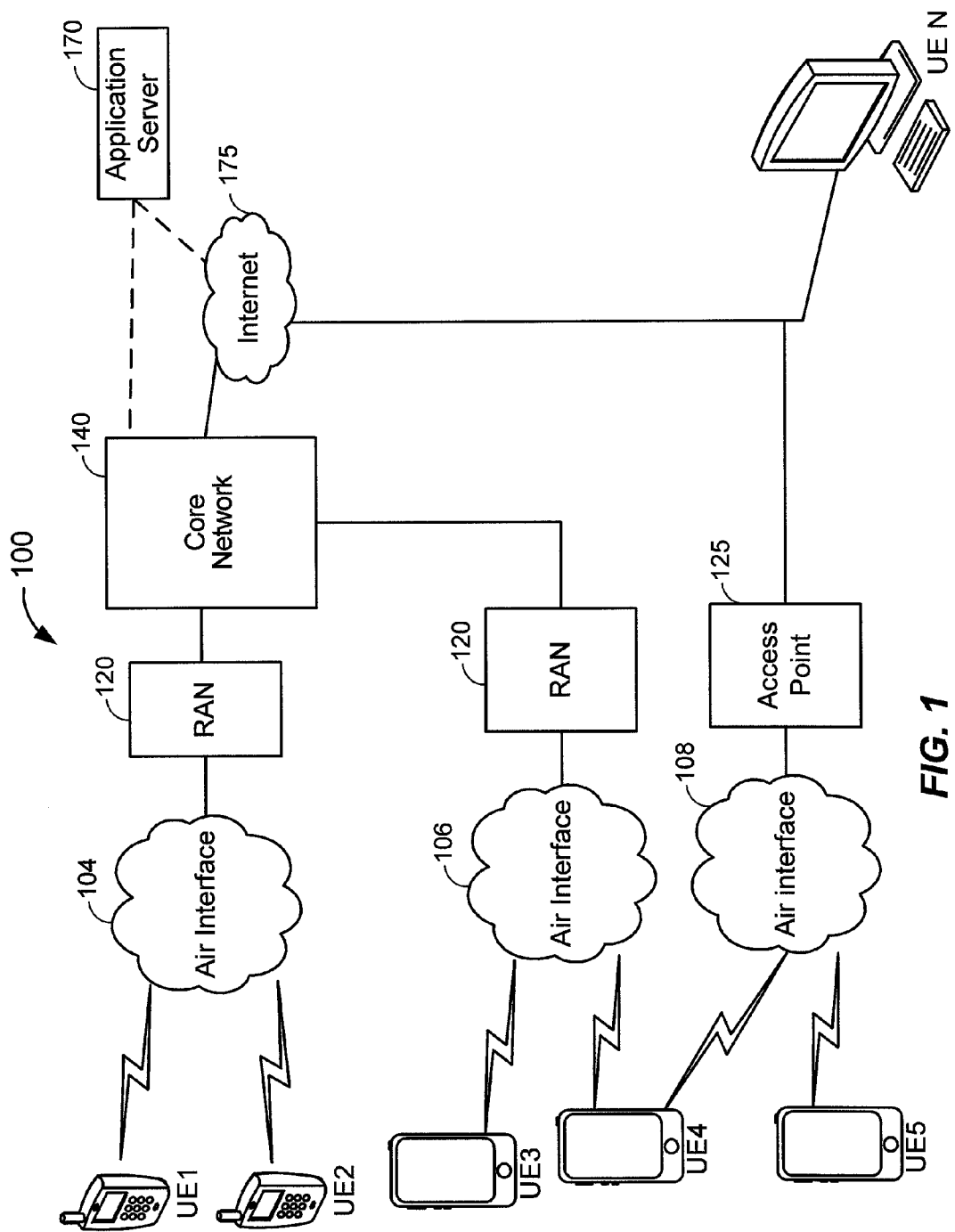
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touch-screen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
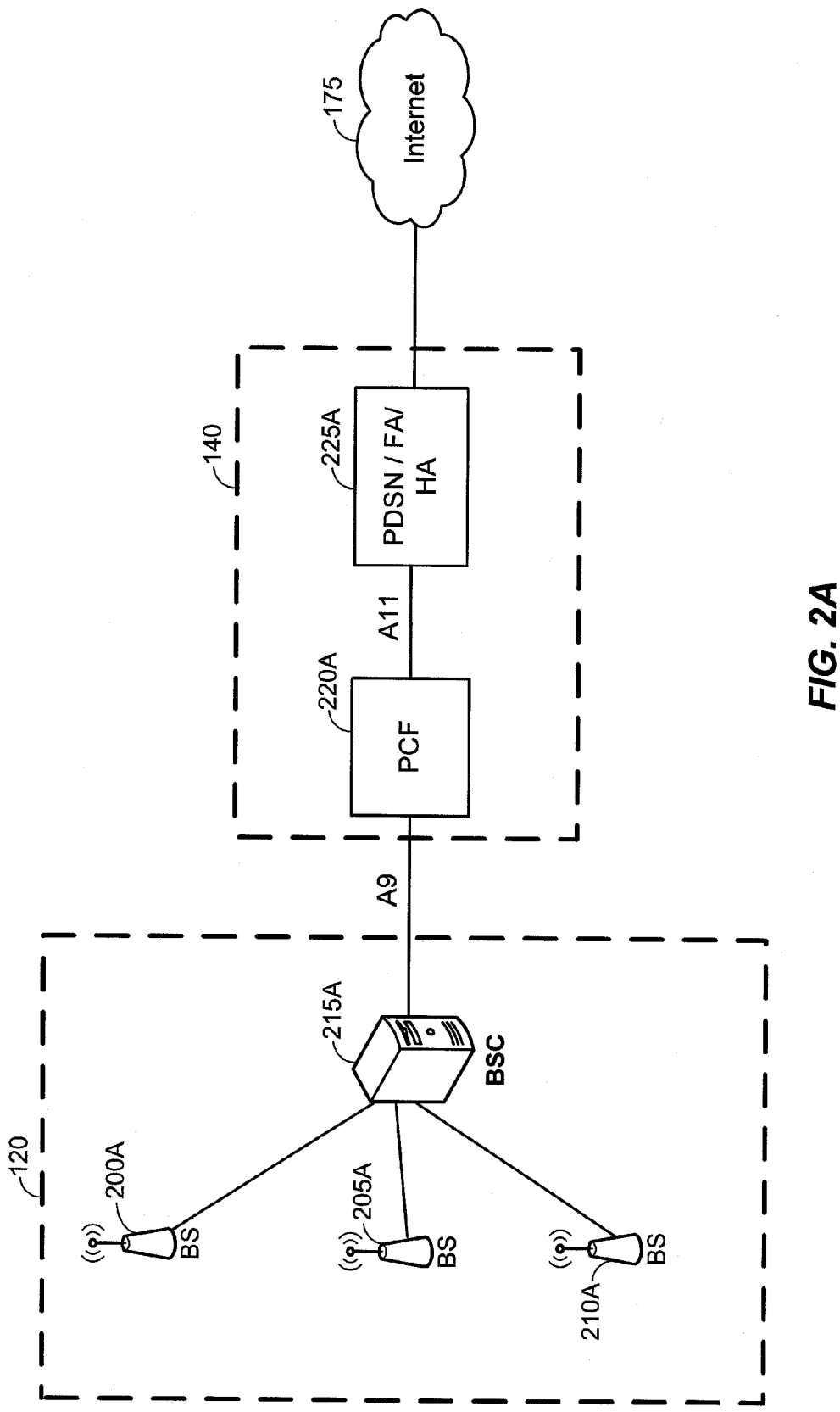
FIG. 2A illustrates an example configuration of a radio access network (RAN) and a packet-switched portion of a core network for a 1×EV-DO network in accordance with an embodiment of the invention.

FIG. 2A illustrates an example configuration of the RAN 120 and the core network 140 for packet-switched communications in a CDMA2000 1×Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
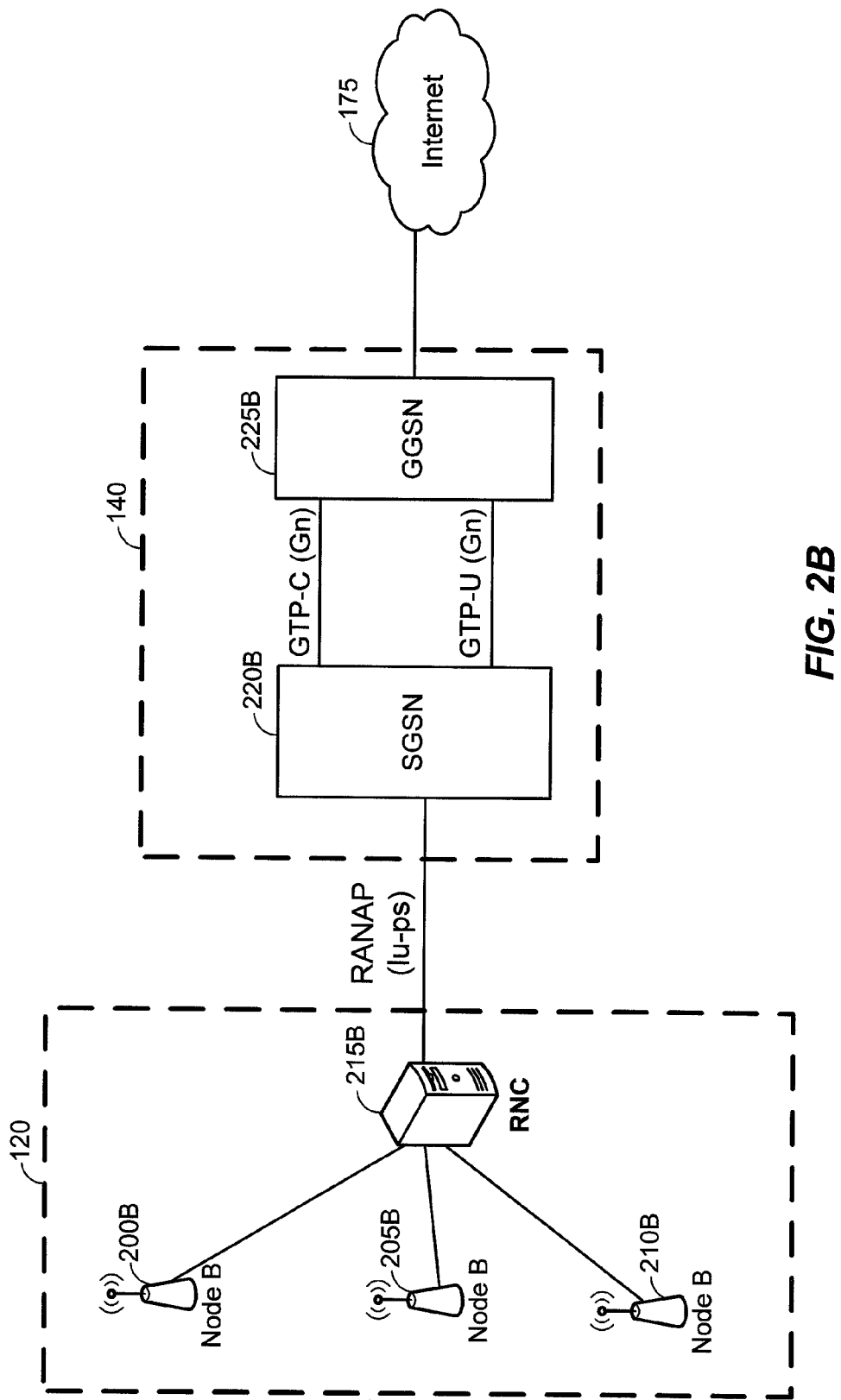
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1×EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
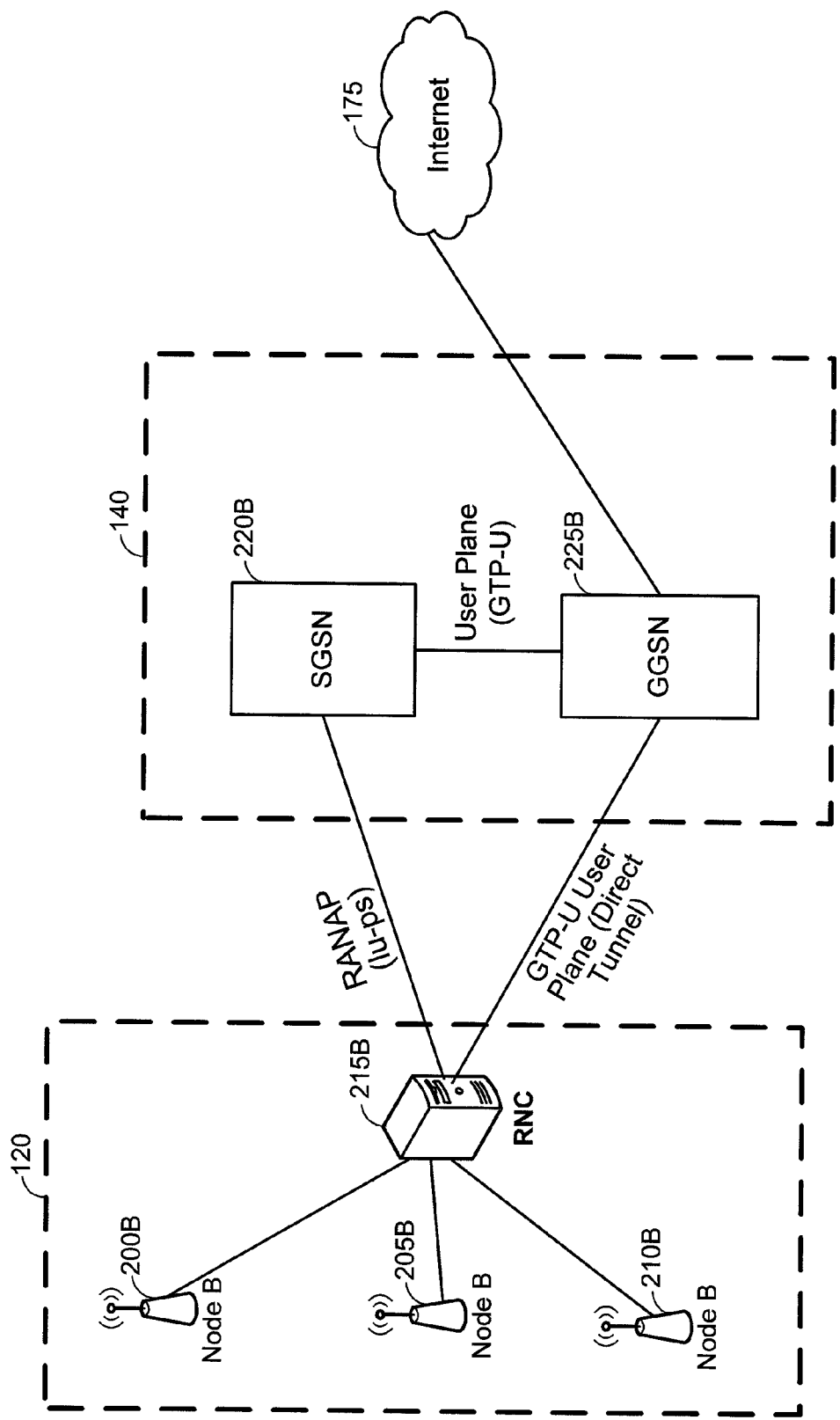
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel When the RAB assigned for a PDP context is released (i.e. the PDP context is preserved) the GTP-U tunnel is established between the GGSN 225B and SGSN 220B in order to be able to handle the downlink packets.

Figure 2D:
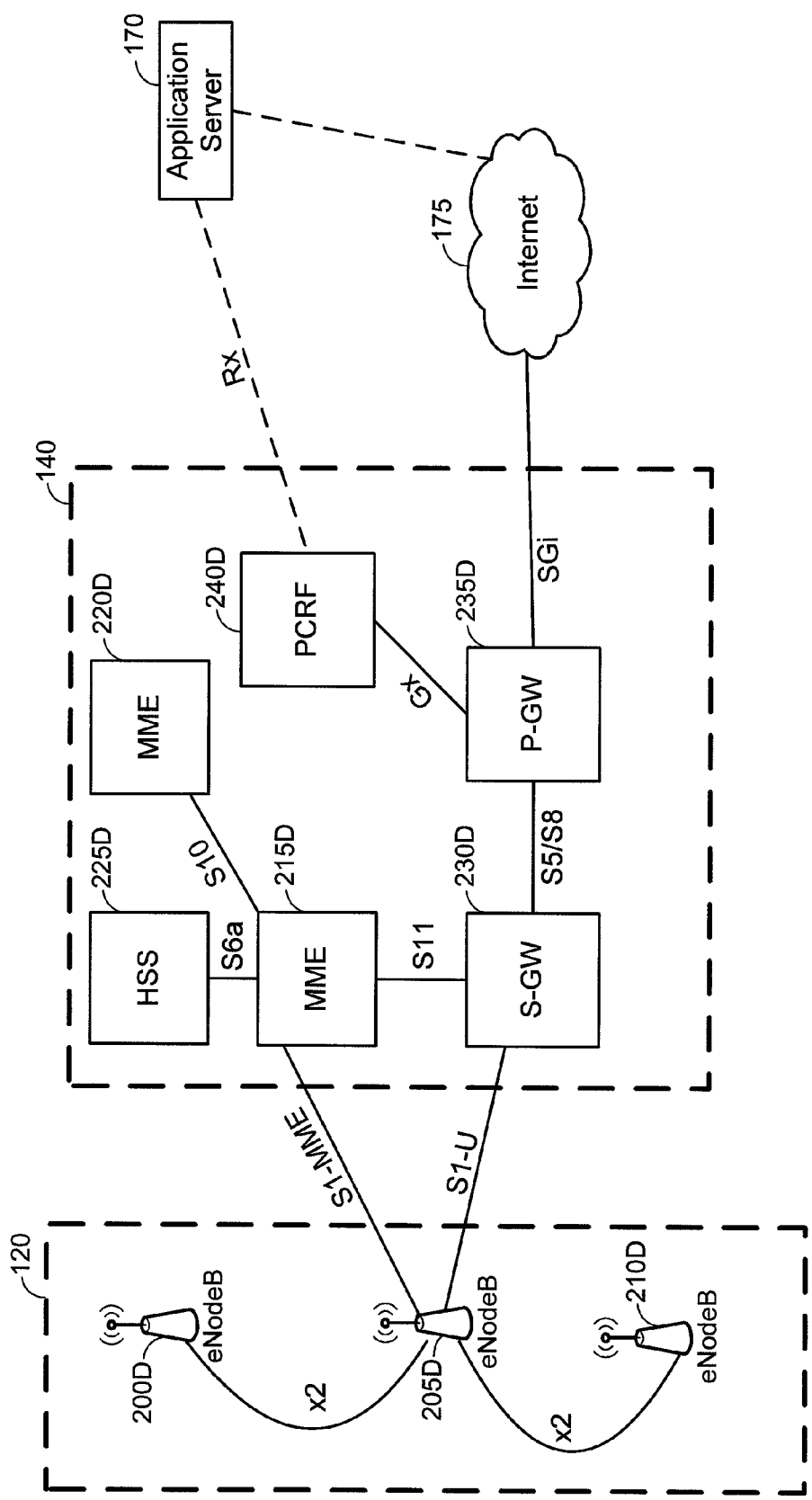
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
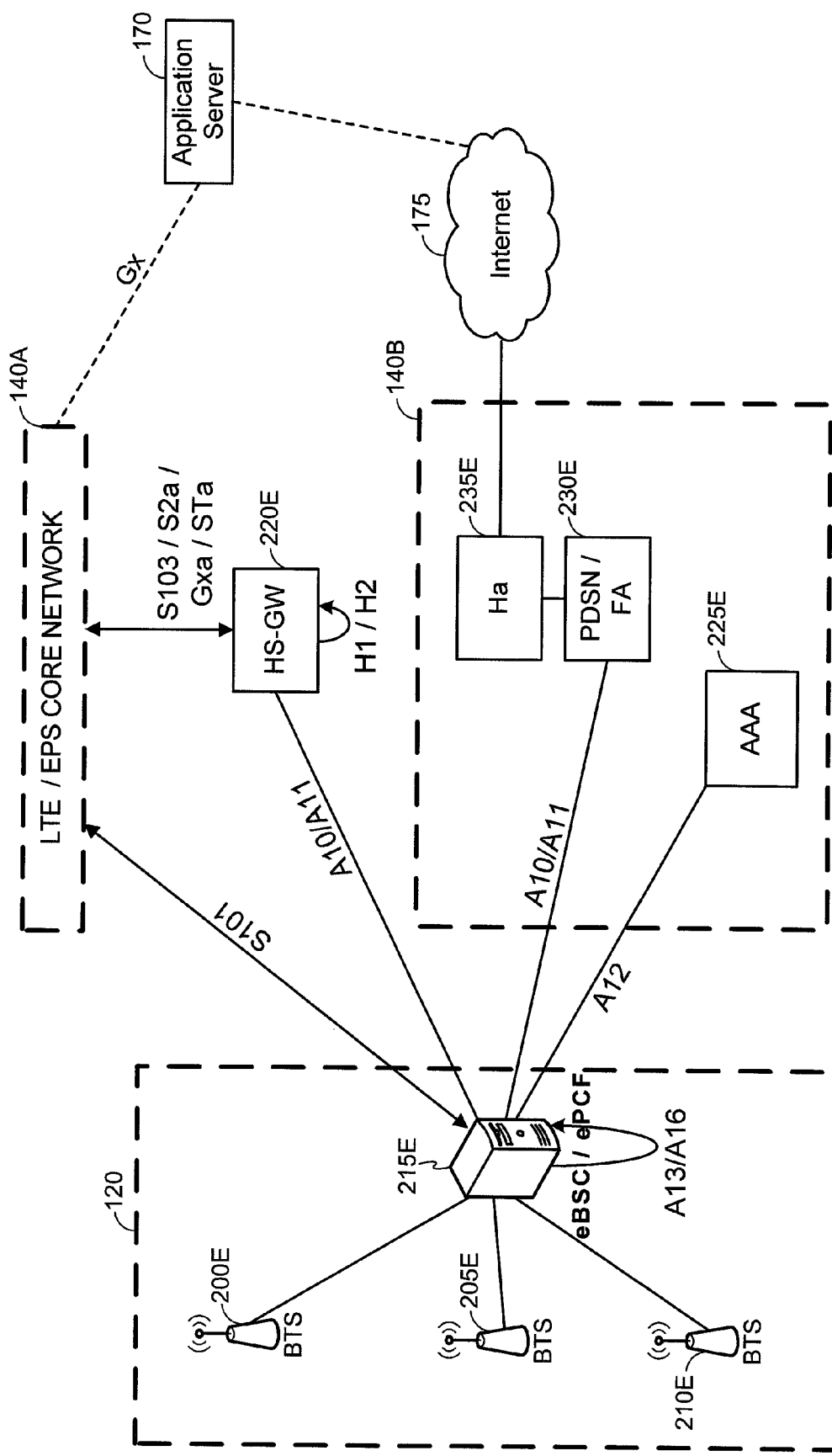
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HS-GW) 220E over A10 and/or A11 interfaces for interfacing with other entities in the EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HS-GW 220E is defined in 3GPP2 to provide the interworking between HRPD networks and EPS/LTE networks. As will be appreciated, the eHRPD RAN and the HS-GW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HS-GWs (e.g., FIG. 2E) can support network-initiated Quality of Service (QoS) (e.g., by the P-GW, GGSN, SGSN, etc.) in certain cases.

Figure 3:
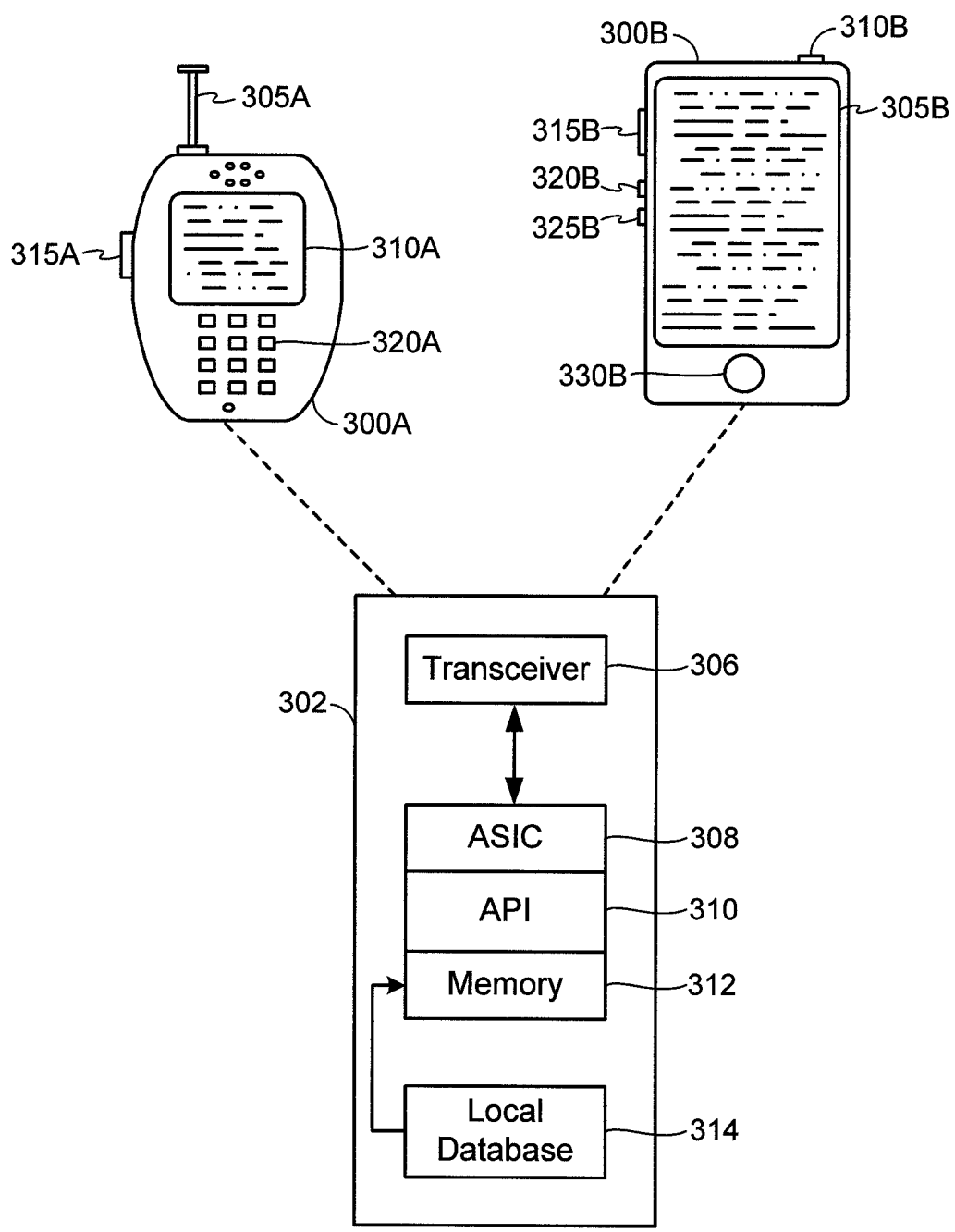
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
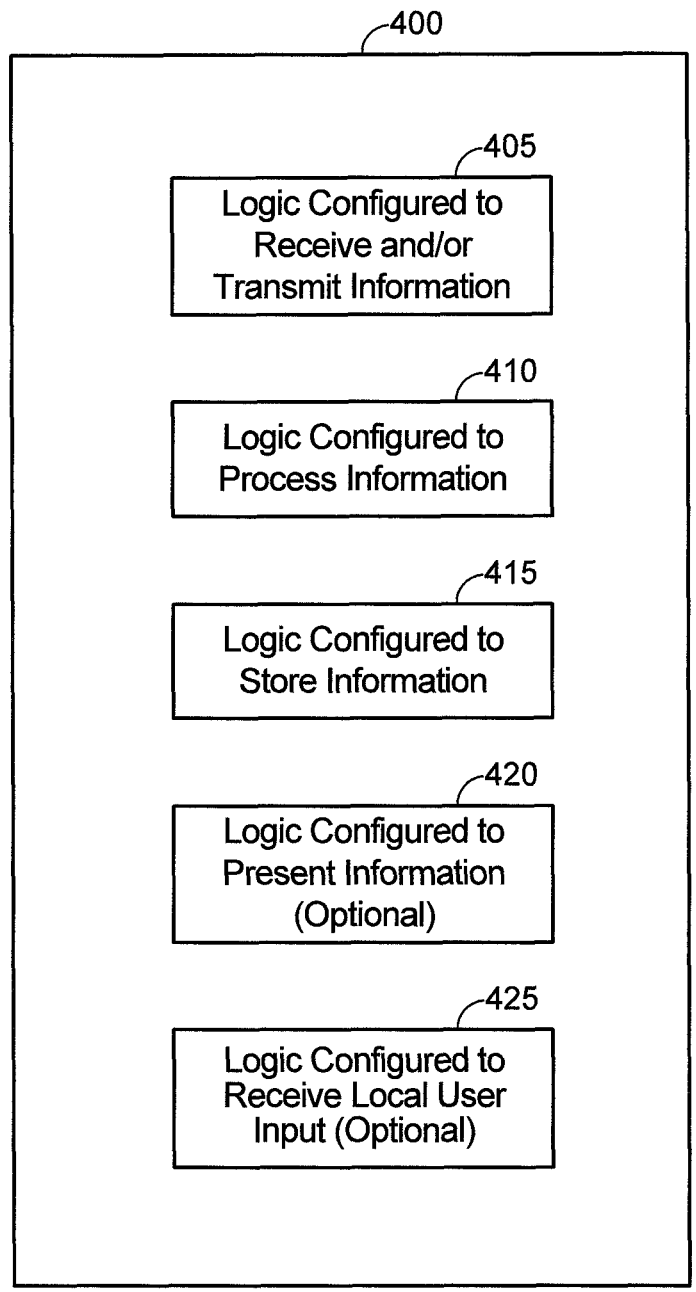
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Sessions that operate over networks such as 1×EV-DO in FIG. 2A, UMTS-based W-CDMA in FIGS. 2B-2C, LTE in FIG. 2D and eHRPD in FIG. 2E can be supported on channels (e.g. RABs, flows, etc.) for which a guaranteed quality level is reserved, which is referred to as Quality of Service (QoS). For example, establishing a given level of QoS on a particular channel may provide one or more of a minimum guaranteed bit rate (GBR) on that channel, a maximum delay, jitter, latency, bit error rate (BER), and so on. QoS resources can be reserved (or setup) for channels associated with real-time or streaming communication sessions, such as Voice-over IP (VoIP) sessions, group communication sessions (e.g., PTT sessions, etc.), online games, IP TV, and so on, to help ensure seamless end-to-end packet transfer for these sessions.

GBR QoS EPS bearers in LTE can be associated with a preconfigured QCI for "Conversational Voice" traffic, denoted as QCI '1', which is associated with a specific QoS configuration for the associated GBR EPS bearers. Any VoIP application engaging in VoIP sessions over the LTE core network can invoke QCI '1'. Generally, different multimedia services that interact with the LTE core network are assigned different APNs for their operation over the LTE core network. For example, IP Multimedia Subsystem (IMS) applications use an IMS-specific APN, whereas a non-IMS application (denoted herein as App*) can used an App*-specific APN, and so on.

Voice Over LTE (VoLTE) is an IMS-based VoIP solution for LTE that uses QCI '1'. A GBR bearer with QCI '1' is configured for VoLTE with the following requirements:

Single Radio Voice Call Continuity (SRVCC): Voice call continuity between IMS over PS access and CS access (over 1× or UMTS) for calls that are anchored in IMS when the UE is capable of transmitting/receiving on only one of those access networks at a given time;

GBR bearer brought up on demand for VoLTE call (no GBR S5 connections maintained in Always On state). The LTE core network maintains the S5 connection between the S-GW 230D and P-GW 240D for default EPS bearers (i.e., EPS bearers that are not allocated GBR QoS) corresponding to each PDN connection in an 'Always On' state, such that the non-GBR QoS EPS bearer is maintained (not released) when the UE transitions from an RRC-Connected state to an RRC-Idle state. The reason for this is that maintaining default EPS Bearer connections in active states does not impact the capacity of the LTE core network. However, for QoS bearers with GBR, LTE core networks typically release the S5 connections when an associated UE is determined to transition from the RRC-Connected state to the RRC-Idle state to conserve resources, because maintaining the S5 connections for GBR EPS bearers consumes core network resources which limit the capacity of the LTE core network';

Configuring semi persistent scheduling (SPS) for the GBR bearer with QCI '1';

Using specific Connected Mode Discontinuous Reception (CDRX) settings for UEs configured for the GBR bearer with QCI '1'; and Enabling Robust Header Compression (RoHC) for the GBR bearer with QCI '1'

However, the typical VoLTE parameters for which QCI '1' is configured may not be suitable for other VoIP applications which use the GBR bearer with QCI '1' as well, but with the traffic model and network architecture different than VoLTE. For example, App* may correspond to a half-duplex VoIP application with a traffic model that can diverge from VoLTE. For instance, (i) App* can bundle more than 1 (e.g. 6) vocoder frames per RTP packet, such that SPS is not efficient for App* traffic, and (ii) as the RTP/UDP/IP header overhead per RTP packet can be minimal for App* (due to the bundling factor of 6), RoHC is less critical and it may thereby not be imperative to enable RoHC to avoid the compressing/decompressing delays. Also, App* may support delay-sensitive communication sessions that are associated with an 'Always On' GBR bearer S5 connection (even in RRC-Idle state) (i) to reduce QoS bearer setup delays during call setup (e.g., as conventional GBR media bearer setup (as in VoLTE) may be too slow), and (ii) to reduce the period for which media traffic is sent on the non-GBR (Best effort or QoS) flow during a call (before the GBR media bearer is fully setup). Also, App* and other non-IMS based VoIP applications may not have interfaces to the IMS network to support anchoring the voice call on a CS network and thereby may not benefit from the above-noted SRVCC feature for VoLTE (instead, the App* and other non-IMS applications may prefer the CS call to be handled by the EV-DO core network or a 1× data network). Conventional VoLTE also does not typically evaluate the actual data activity on the GBR EPS bearer or non-GBR EPS bearer to control the GBR (or other QoS parameters) for the GBR EPS bearer.

Conventionally, the eNodeB 205D is aware of the QCI for a particular GBR EPS bearer, such as QCI '1' for VoLTE, but the eNodeB 205D is not aware of the APN for the GBR EPS bearer associated with that QCI. Thus, the eNodeB 205D generally cannot distinguish between a VoLTE session allocated QCI '1' and an App* session (or other non-IMS session) allocated QCI '1'. Accordingly, applying application-specific (or APN-specific) QCI configurations in LTE networks can be difficult. A conventional procedure that uses the QCI as a call-type identifier for loading QoS resources for an IMS session will now be described with respect to FIG. 4A.

Figure 4A:
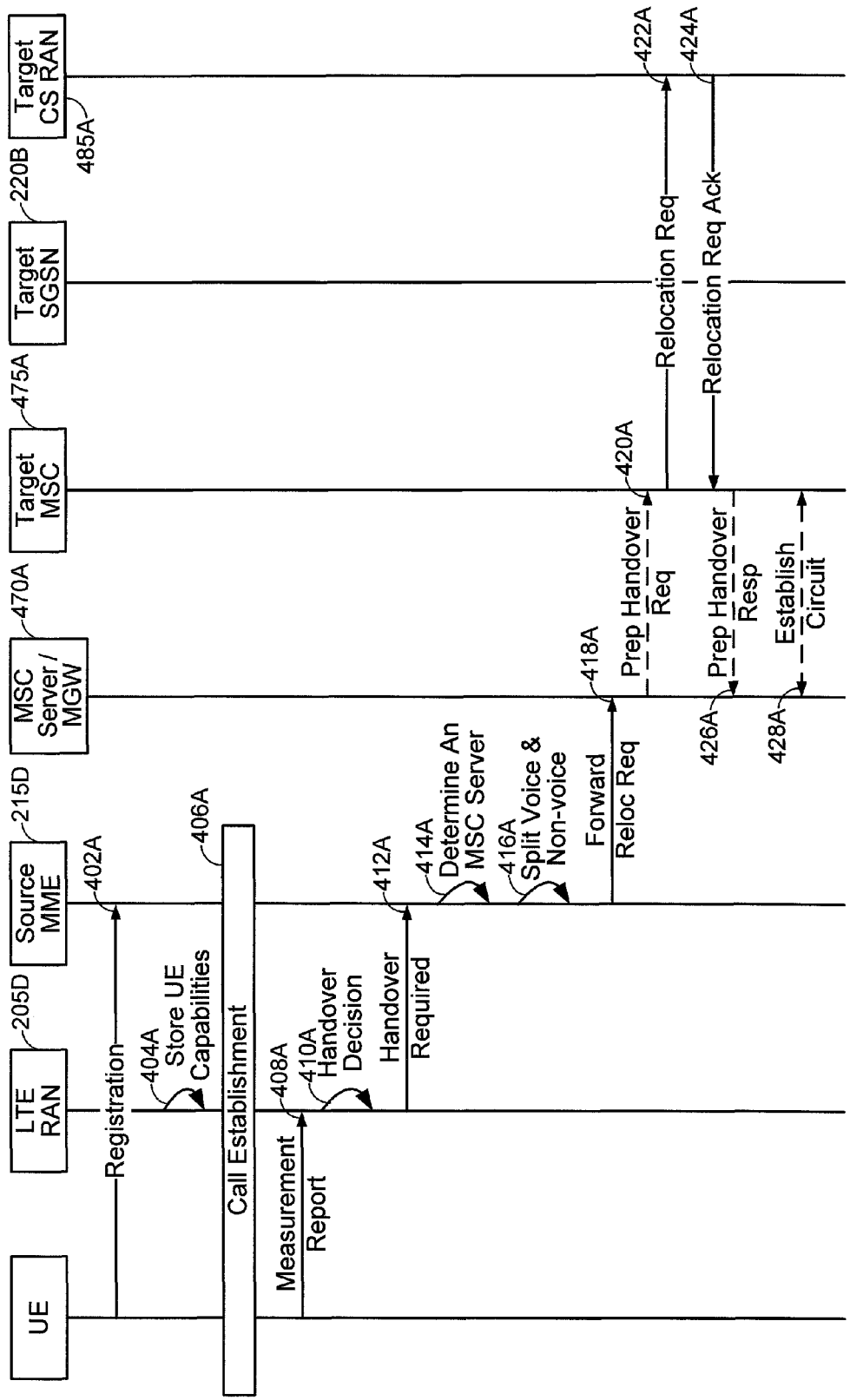
FIG. 4A illustrates an inter-technology Single Radio Voice Call Continuity (SRVCC) handoff without the need for an SRVCC indicator.

FIG. 4A illustrates an inter-technology (i.e., LTE-to-circuit switched network), SRVCC handoff without the need for an SRVCC indicator. In FIG. 4, the UE establishes a communication session that comprises a voice component in a packet data network such as LTE. In response to determining to handoff the communication session to a target network, the source network determines that the communication session comprises a voice component based on a call-type identifier (i.e., a QCI) that is associated with a voice call and further determines that a target network is a circuit switched network based on configuration information maintained in association with the target network. In response to determining that the communication session comprises a voice component, that the target network is a circuit switched network, and, based on a profile of the UE, that the UE is capable of operation in single radio mode, the source network determines to implement a SRVCC handoff procedure.

Referring to FIG. 4A, a UE registers (402A) with MME 215D. For example, the UE may activate in a coverage area of the LTE RAN 120 served by MME 215D or the UE may be handed off to the LTE RAN 120 served by MME 215D. As part of the registration process, MME 215D obtains and stores (404A) a profile of the UE that includes a UE identifier, such as an International Mobile Subscriber Identity (IMSI) or any other UE identifier known in the art, and information concerning the capabilities of the UE, such as whether the UE is a single radio UE or that operates in, or is capable of operating, in a single radio mode. For example, MME 215D may obtain this information from the UE as part of the registration process or the MME 215D may retrieve this information from HSS 225D or from a Home Location Register (HLR) or a Visited Location Register (VLR) that maintains such information when the UE registers with the MME.

Referring to FIG. 4A, at some point in time, UE 102 establishes (406A) a communication session via the LTE core network 140, whereby the communication session is controlled by an IMS network (not shown) via a Mobile Switching Center (MSC) Server/MSC Server/Media Gateway (MGW) 470A and is anchored at a Voice Call Continuity Application Server (VCC AS) (not shown). The communication session includes a voice component, such as an IMS telephony session. When the communication session is set up, the UE is allocated a bearer path in the LTE RAN 120 and the LTE core network 140 that includes one or more bearer channels in an air interface and one or more S1 bearer tunnels in an S1 interface, including a voice bearer tunnel and a non-voice bearer tunnel if non-voice bearer data is involved, whereby voice data and non-voice data then are exchanged with the UE as part of the communication session. Further, as part of the set up of the communication session, the UE is assigned by the LTE RAN 120, a call-type identifier (i.e., a QCI) that is associated with a voice call. Further, as part of the call set up, the LTE RAN 120 conveys the call-type identifier to MME 215D along with the UE identifier. MME 215D then stores the call-type identifier in association with the UE identifier. However, the LTE RAN 120 may convey the indicator to MME 215D as part of a handoff request conveyed to the MME as described below.

While the UE is engaged in the communication session via LTE core network 140, the UE monitors qualities, in particular a signal strength or alternatively any of a variety of other signal qualities such as a signal-to-noise ratio (SNR), a carrier-to-interference ratio (C/I), pilot power-to-total power (Ec/Io) ratio, a bit error rate (BER), or a frame error rate (FER), of pilots associated with each of the serving RAN, that is, LTE RAN 120, and one or more neighboring RANs, such as a RAN of a circuit switched network ("circuit-switched RAN 485A"). The UE may self-determine when or whether to monitor the pilots associated with the circuit-switched RAN 485A or may monitor the pilots in response to receiving an instruction to do so from the LTE core network 140.

The UE reports (408A) the monitored pilot(s) in accordance with well known reporting procedures. For example, when a quality of a pilot of the circuit switched RAN 485A and more particularly of an air interface, is measured by the UE when operating in LTE core network 140 and exceeds an inter-system handoff threshold, or a quality of a previously reported pilot of LTE core network 140, and more particularly of an air interface, is measured by the UE when operating in LTE core network 140 and falls below an intra-system handoff threshold, the UE may report the monitored pilot(s) back to LTE RAN 120. LTE RAN 120 then stores the reported pilot measurements.

Based on the pilot measurements associated with LTE RAN 120 and the circuit-switched RAN 485A and reported by the UE, the LTE core network 140 determines (410A) to handoff the communication session. For example, when a pilot of the LTE RAN 120 compares unfavorably to (is below, in the case of a signal strength threshold) the intra-system handoff threshold and/or a pilot of one or more measured RANs, such as the circuit-switched RAN 485A, compares favorably to (exceeds, in the case of a signal strength threshold) the inter-system handoff threshold, this may indicate a desirability of a handoff.

In response to determining to handoff the communication session, the LTE RAN 120 assembles a request to handoff the communication session that includes the measurements and that further identifies the UE to be handed off. The request further includes a handoff target identifier, such as an identifier of a target RAN 485A, that is, the circuit-switched RAN 485A, or of a target cell, or target cell radio technology category associated with the circuit-switched RAN 485A, and, as noted above, may include a call-type indicator, such as a QCI, indicating that the communication session includes a voice component. The LTE RAN 120 then conveys (412A) the handoff request to MME 215D.

Based on the target RAN 485A or a target cell identifier and with reference to the configuration information maintained by MME 215D, the MME 215D determines (414A) the MSC Server 470A and target MSC, that is, MSC 475A, associated with the target RAN, that is, the circuit-switched RAN 485A. Further, based on the configuration information maintained for MSC 475A by MME 215D, the MME 215D determines that the UE is moving to a circuit switched network, that is, the circuit switched RAN 485A, and based on and the received identifier of the UE, retrieves the UE capability information maintained by the MME 215D or received by the MME 215D from the LTE core network 140, and further based on a call-type indicator for voice bearer, determines that the UE is invoking a SRVCC handoff procedure. More particularly, in response to receiving the request, MME 215D determines, based on the profile of the UE maintained by the MME 215D, that the UE is a single radio UE or at least is capable of operating in a single radio mode. MME 215D further determines, based on the QCI associated with the communication session, that the communication session includes a voice component and, in light of the determination that the UE is a single radio UE and target MSC 475A supports circuit switched voice calls, that the UE is requesting, and therefore determines to implement, a SRVCC handoff procedure. MME 215D also determines, based on the configuration information maintained by the MME 215D for MSC 475A, that the MSC 475A supports a SRVCC handoff procedure.

Based on the determination that the communication session includes a voice component, that this is an SRVCC handoff, and that MSC 475A supports SRVCC, if multimedia sessions are active in the UE then the MME 215D splits (416A) the routing of the voice component, or bearer, of the communication session from a routing of any non-voice component, or bearer, of the communication session in order to handoff only the voice component of the communication session to the circuit switched RAN 485A and MSC 475A. If the UE has the capability of simultaneously for voice and packet service in the target circuit switched RAN 485A, MME 215D further may determine another RAN that is part of a packet data network for a handoff of any such non-voice component, for example, a video component, of the communication session. Otherwise, the non-voice component may be suspended.

MME 215D then requests (418A) a handoff of the voice component of the communication session to the circuit-switched RAN 485A and MSC 475A, and an allocation of resources to the UE by the circuit-switched RAN 485A and MSC 475A, by conveying a Forward Relocation Request message to MSC Server/MGW 470A. As is known in the art, the Forward Relocation Request message may comprise a relocation type, a cause, an identifier of the UE, such as a Meaning Category Mobile Station Integrated Services Data Network (MSISDN), identifiers of source the LTE RAN 120 and target circuit-switched RAN 485A, a Source to Target Transparent Container, a session transfer number, and mobility management (MM) context information. MME 215D may obtain the session transfer number and MSISDN from HSS 225D when the UE registers with, that is, attaches to, the MME 215D and then stores the VDN and MSISDN in the UE's profile at the MME, or obtains session transfer number at the time of call establishment.

In response to receiving the handoff and resource allocation request from MME 215D, MSC Server/MGW 470A conveys (420A) a handoff and resource allocation request to target MSC 475A. That is, MSC Server/MGW 470A interworks the packet data network handoff and resource allocation request received from MME 215D with a circuit switched network inter-MSC handoff request and conveys the circuit switched network inter-MSC handoff request, such as a Prepare Handover Request message to target MSC 475A. The Prepare Handover Request message identifies the UE and the target circuit-switched RAN 485A.

In response to receiving the handoff and resource allocation request from MSC Server/MGW 470A, MSC 475A instructs (422A) the circuit-switched RAN 485A to allocate resources to the UE by conveying a Relocation Request message to the circuit-switched RAN 485A. In response to receiving the Relocation Request message, circuit-switched RAN 485A allocates resources, such as radio access bearer (RAB) parameters, to the UE and acknowledges (424A) the allocation of the resources and identifies the allocated resources by conveying a Relocation Request Acknowledgement message to MSC 475A. In response to receiving the Relocation Request Acknowledgement message, MSC 475A conveys (426A) a Handover Preparation Response message back to MSC Server/MGW 470A that identifies the resources allocated by circuit-switched RAN 485A and includes a handover number (HO#) for establishment of a circuit connection between the MSC 475A and MSC Server/MGW 470A. Target MSC 475A and MSC Server/MGW 470A then allocate (428A) resources for the handoff of the UE, including establishing a circuit connection between the MSC and the MSC Server/MGW via an exchange of ISUP IAM (ISDN User Part Initial Address Message) and ISUP ACM (Address Complete Message) messages.

As discussed above with respect to FIG. 4A, a set of preconfigured call-type identifiers (or QCIs) can be used for loading preconfigured QoS configurations for IMS sessions. However, in FIG. 4A, information that identifies a specific application (e.g., a particular multimedia application arbitrated to a particular server over the Internet 175, etc.) is not used to load a specific customized (or application-specific) QoS configuration. Instead, conventionally, the multimedia application would be forced to use one of the preconfigured QCIs and thereby one of the associated preconfigured QoS configurations. Embodiments of the invention are directed to a number of different implementations for selectively loading application-specific features/support parameter configurations at LTE network components.

In a first embodiment of the invention, the LTE standard permits QCIs in a range between 128-255 to be reserved, and one or more of the QCIs in this range can be reserved with an application-specific QCI configuration (e.g., for App*). A given QCI ($QCI_{App}$*) can thereby be reserved for App*, such that when a GBR EPS bearer associated with $QCI_{App}$* is activated on a given UE, the eNodeB 205D does not perform SRVCC, does not enable RoHC, etc., and the P-GW 235D and S-GW 235D maintain the GBR EPS bearer's S5 connection in an 'Always On" state (even when the given UE is in RCC-Idle state), although its air interface resources may be permitted to lapse in RCC-Idle state. As will be appreciated, this embodiment requires the LTE standard to be updated to recognize $QCI_{App}$*, it may be difficult for each LTE network component to distinguish between application-specific traffic and to reserve a different QCI for each application type, and even if some additional QCIs are defined for non-IMS based VoIP applications (such as App*), different of these applications may be assigned to the same QCI even if the different non-IMS based VoIP applications have different requirements from each other.

In a second embodiment of the invention, LTE network components (e.g., eNodeB, S-GW, P-GW, etc.) can use Differentiated Services Code Point (DSCP) marking (assuming each voice application on the UE marks the IP header of the media packets with a DSCP different than IMS solution) to identify when traffic is active for a non-IMS solution, and, each of the LTE network component can activate features/support parameter configuration separately for each application based on the DSCP marking. As will be appreciated, VoIP applications in this embodiment may attempt to use Expedited forwarding and thus uniquely identifying each application-type via DSCP marking may be difficult.

In a third embodiment of the invention, LTE network components (e.g., eNodeB, S-GW, P-GW, etc.) can use a combination of QCI and APN to identify the application (e.g., App*, etc.) using the GBR EPS bearer and then activate application-specific features/support parameter configuration separately for each application based on its unique QCI and APN combination. As noted above, the eNodeB 205D does not typically have access to the APN information of a GBR EPS bearer, so additional procedures can be adopted into the LTE standard to pass the APN information of the GBR EPS bearer to the eNodeB 205D. For example, the MME 215D can pass the APN information to the eNodeB 205D. Also, operators can define rules at each entity on what features/configuration are applicable for a specific QCI+APN combination. As will be appreciated, this embodiment provides APN-specific feature support, parameter configuration granularity and flexibility for operators in defining the service performance for each application. It will also be appreciated that this embodiment requires the LTE standard to be modified to accommodate a new APN field in messaging between the MME 215D and the eNodeB 205D, and also between different eNodeBs. Several of the embodiments below are described with respect to this third embodiment, which may be referred to as the QCI+APN embodiment, because a combination of the QCI and APN are used to signal the appropriate configuration to be loaded for a particular QoS bearer. However, it will be readily appreciated that certain of the embodiments described below could be modified based on the first and/or second embodiments for identifying the appropriate application-specific configuration, and the QCI+APN references are provided mainly for convenience of explanation.

Figure 6:
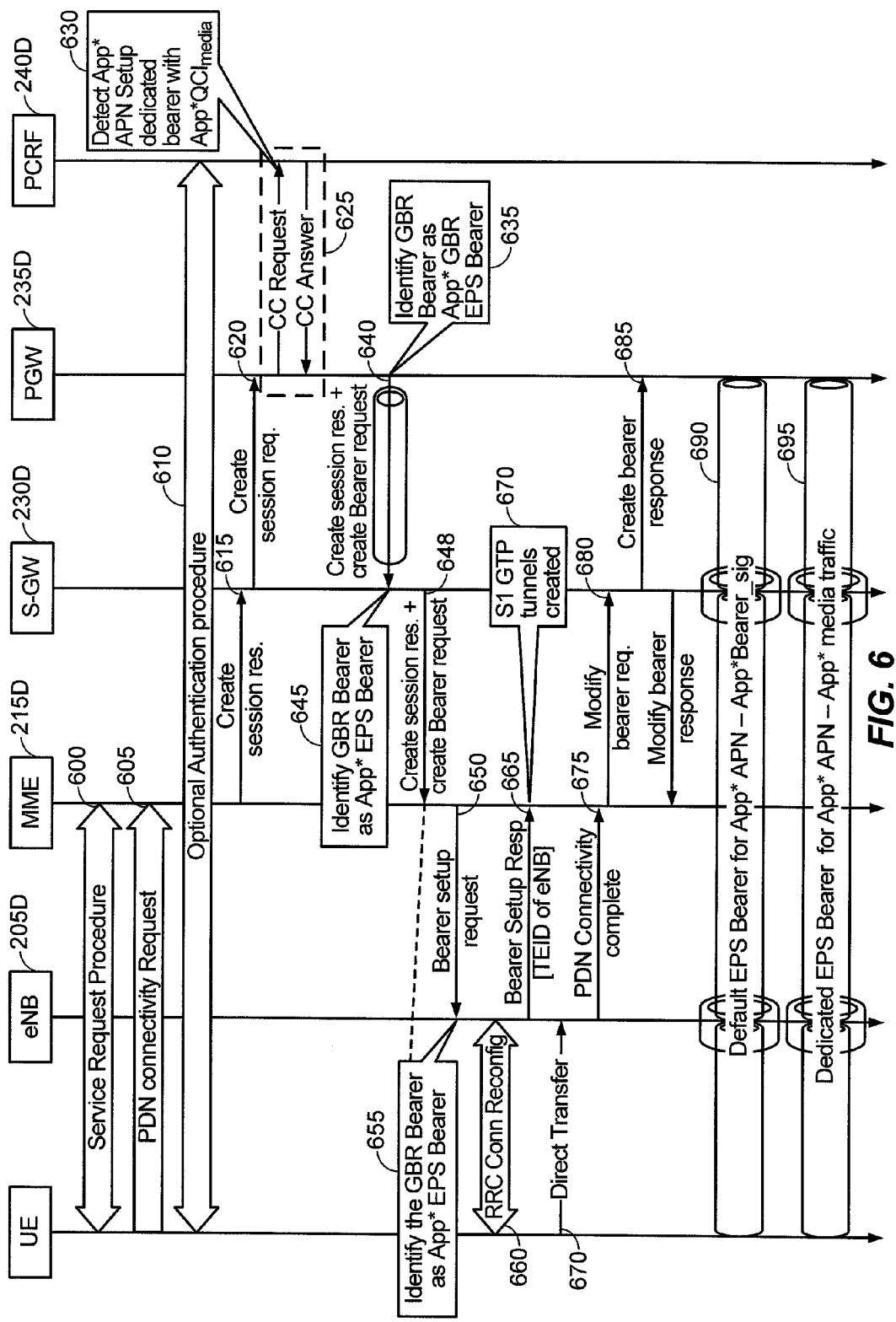
FIG. 6 shows how access point name (APN) information can be exchanged during a QoS setup procedure for a particular GBR EPS bearer that is not 'Always On' in accordance with an embodiment of the invention.

Below, FIG. 5 illustrates an 'Always On' QoS setup procedure for a particular GBR EPS bearer, and FIG. 6 shows how the APN information can be exchanged during a QoS setup procedure for a particular GBR EPS bearer that is not 'Always On'. Because the S-GW 230D and P-GW 235D are already provisioned with the APN information, and FIG. 5 illustrates a scenario where the S-GW 230D and P-GW 235D keep the App* GBR EPS bearer 'Always On', the propagation of the APN information to the eNodeB 205D (shown in FIG. 6) is not strictly necessary for FIG. 5. The App* identifying information in FIG. 6 can be exchanged via a reserved QCI (first embodiment), DSCP signaling (second embodiment) or an APN+QCI combination (third embodiment) in FIGS. 5-6.

FIG. 5 illustrates a process of setting up 'Always On' non-GBR and GBR EPS bearers in an LTE network in accordance with an embodiment of the invention. For example, the process of FIG. 5 can execute in the LTE environment shown above with respect to FIG. 2D, in an example.

Referring to FIG. 5, 500 corresponds to an initial procedure whereby a given UE sets up a non-QoS EPS bearer. The setup of the non-QoS EPS bearer begins with the given UE in an RRC-Idle state, 505, after which a System Information reading operation is performed, 510, the Non-Access Stratum (NAS) layer at the given UE initiates EPS attach and PDN connectivity procedures, 515, the given UE and the LTE core network 140 engage in an RRC connection and context set-up procedure, 520, after which the given UE is transitioned into the RRC-Connected state, 525. At this point, a default EPS bearer (or non-GBR QoS EPS bearer) is established for the given UE, 530, and an 'Always On' S5 connection is set-up for the default EPS bearer, 535. The default EPS bearer can be used to support applications that exchange data for which QoS (e.g., GBR, etc.) is not required, such as web-browsing applications, Email applications, and so on.

The remainder of FIG. 5 describes setup of a GBR EPS bearer for a high-priority GBR application, which is denoted as App*. For LTE networks, App* can correspond to any application that requires GBR QoS on an associated EPS media bearer for supporting its communication sessions (e.g., PTT sessions, VoIP sessions, etc.) and that uses a dedicated Access Point Name (APN), where the dedicated APN is configured to specifically identify App* to external devices, such as components of the LTE core network 140. In non-LTE networks, App* can be supported on other types of QoS bearers.

Accordingly, after 535, the given UE launches App*, 540, sends a PDN Connectivity Request for App* to the MME 215D, 545, and the MME 215D sends a Create Session Request (e.g., configured with EPS Bearer QoS (QCI '5')) to the P-GW/PCRF 235D/240D, 550. At this point, the LTE core network 140 can initiate set-up of the dedicated bearer for App*'s PDN connection, or alternatively the application server 170 or UE request the dedicated GBR EPS bearer setup, 555. In either case, the P-GW/PCRF 235D/240D sends a Create Session Response message (e.g., which can be configured as (EPS Bearer QoS(QCI '5'))+Create Bearer Request(EPS Bearer QoS(QCI–'QCI$_{App}$*' or '1', GBR UL/DL–'X$_{App}$*'kbps))) to the MME 215D which sets up the GBR EPS bearer with a GBR that is specific to App* (e.g., a nominal data rate such as 1 kpbs, or X$_{App}$* kpbs, 560. The MME 215D then delivers a Bearer Setup Request message (e.g., which can be configured with (Default EPS Bearer QoS(QCI '5'), Dedicated EPS Bearer QoS(QCI–'QCIApp*' or '1', GBR UL/DL–'XApp*'kbps))) to the eNodeB 215D to set-up the App*-specific GBR, 565, and the eNodeB 215D allocates the GBR for App*'s GBR EPS bearer as requested, 570. App*'s signaling bearer is setup, 575 and 580, and App*'s GBR EPS media bearer is also setup, 585 and 590.

Turning to App* in more detail, App*'s media traffic model can be configured differently than the typical VoIP application traffic. For example, App* can be configured to bundle at least one (e.g., 6) Vocoder frames into a single RTP packet and to transmit media packets every 120 ms. Thus, the data rate and air interface configurations required for the App* media bearer can be different than a VoIP media bearer, which is referenced as QCI '1' in LTE networks. So, it may not be suitable to use QCI '1' (conversational voice) for App*.

The LTE standard can reserve a QCI in the range 128-255 for certain multimedia applications (e.g., PTT applications), and can allocate GBR QoS for this QCI. The S-GW 230D and P-GW 235D can identify App*'s GBR EPS bearer during initial bearer setup or bearer setup due to x2 or 51 based handover based on the reserved QCI for App* ("App*QCI", for signaling and/or media), or alternatively based upon QCI '1' where the GBR EPS bearer is associated with an APN that is known to be related to App* (so the LTE core network knows to use App*'s specialized QoS parameters instead of the typical QCI '1' QoS parameters). In an example, the recognition of the App*-specific GBR EPS bearer can be used to prompt the LTE network components (e.g., such as the MME 215D) to identify App*'s GBR EPS bearer and to perform actions based upon this recognition, such as selectively caching the GBR parameters for the GBR EPS bearer of a particular APN for quickly bringing up S5 connections after an RRC Idle-to-Connected transition. The eNodeB 205D can identify App*'s GBR EPS bearer during initial bearer setup bearer setup due to x2 or 51 based handover based on the reserved App*QCI to provide the requested QoS treatment. This procedure is shown in FIG. 6.

Referring to FIG. 6, the given UE, the eNodeB 205D and the MME 215D perform a service request procedure, 600, and the given UE delivers a PDN connectivity request for App* to the MME 215D, 605. Optionally, an authentication procedure can be performed for the given UE with the PCRF 240D, 610. The MME 215D delivers a Create Session Request to the S-GW 230D for App*, 615, and the S-GW 230D delivers a Create Session Request to the P-GW 235D for App*, 620. The P-GW 235D and the PCRF 240D then engage in an IP CAN session, 625, during which the PCRF 240D detects the App* APN, and applies App*QCI$_{signaling}$ to the default bearer and initiates a dedicated bearer with App*QCI$_{media}$, 630.

Referring to FIG. 6, the P-GW 235D identifies the GBR EPS Bearer as an App* EPS Bearer based on App*QCI$_{media}$ and being associated with App*'s APN, 635. The P-GW 235D sends a Create Session Response+Create Bearer Request to the S-GW 230D that indicates App*QCI$_{media}$, 640. The S-GW 230D identifies the GBR EPS Bearer as an App* EPS Bearer based on App*QCI$_{media}$ and being associated with App*'s APN, 645. The S-GW 230D sends a Create Session Response+Create Bearer Request to the MME 215D that indicates App*QCI$_{media}$, 648, and the MME 215D in turn sends a PDN Connectivity Accept+Dedicated Bearer Set Request message to the eNodeB 205D that indicates App*QCI$_{media}$, 650. The MME 215D and the eNodeB 205D identifies the GBR EPS Bearer as an App* EPS Bearer based on App*QCI$_{media}$, 655. The GBR EPS bearer for media is then setup with App*QCI$_{media}$, and the default EPS bearer for App*'s signaling is setup with App*QCI$_{signaling}$, as shown in the signaling between 660-695, which will be readily understood by one of ordinary skill in the art familiar with QoS setup in LTE networks.

Figure 7:
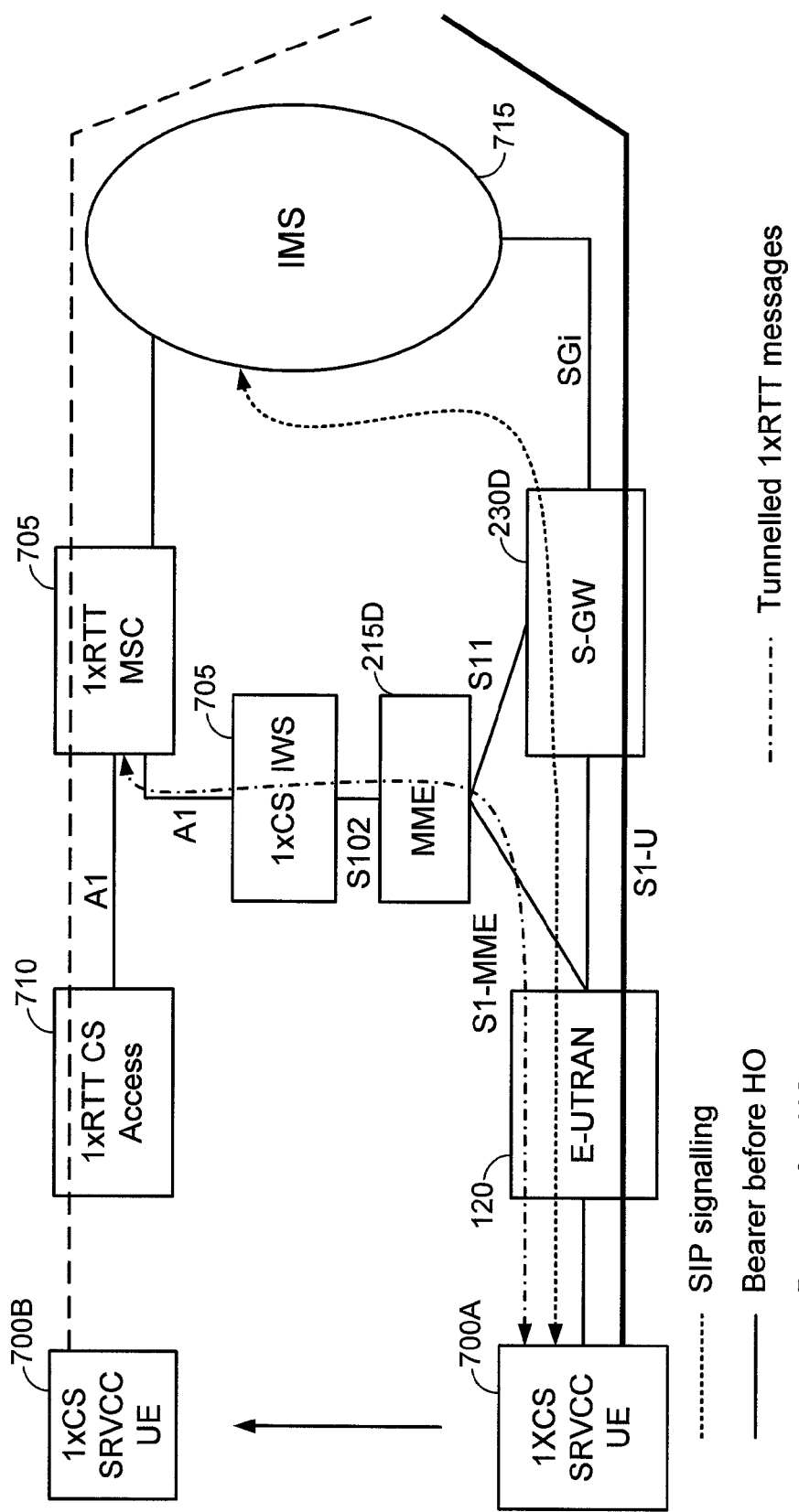
FIG. 7 illustrates a conventional packet-switched (PS) to circuit switched (CS) call transition (or handoff) for an Internet Protocol (IP) Multimedia Subsystem (IMS) session.

Further, as discussed above with respect to IMS applications, IMS typically enables SRVCC for seamlessly switching calls between CS and PS networks. FIG. 7 illustrates a conventional PS-to-CS call transition (or handoff) for an IMS session.

Referring to FIG. 7, the LTE RAN 120 is illustrated, as well as certain PS-components of the LTE core network 140 from FIG. 2D. Specifically, the MME 215D and S-GW 230D are shown in FIG. 7. Also shown in FIG. 7 is a 1×CS SRVCC-enabled UE 700A, which is served by the LTE RAN 120 (or E-UTRAN) during an IMS call, and then undergoes a handoff to a 1×RTT CS RAN 710. Once transitioned to the 1×RTT CS RAN 710, the 1×CS SRVCC UE is referenced as 700B. The PS-to-CS handoff is managed at the LTE core network 140 via interfacing the MME 215D with a 1×CS Interworking Service (IWS) 705) over an S102 reference point, and to an 1×RTT Mobile Switching Center (MSC) 705 over an A1 interface. The IMS call is arbitrated by an IMS server 715 both before and after the handoff, although the IMS server is connected to the 1×CS SRVCC UE over the different RANs before and after the handoff.

An embodiment of the invention is directed to disabling SRVCC for non-IMS calls, such as App* calls. As noted above, SRVCC is typically enabled for any calls that are carried upon GBR EPS bearers setup with QCI '1'. Below, a discussion of SRVCC is discussed with respect to 3GPP TS 23.216v9.8.0, after which the selective SRVCC-disabling scenarios are discussed with respect to FIGS. 8-9.

As noted above, SRVCC relates to voice call continuity between the IMS server over PS access and CS access for calls that are anchored in IMS when the UE is capable of transmitting/receiving on only one of those networks at a given time. SRVCC-enabled UEs include a SRVCC capability indication as part of the "UE Network Capability" in the Attach Request message. The MME 215D stores this information for SRVCC operation. If the MME 215D supports interworking with CS network (3GPP or 3GPP2), and the SRVCC UE also indicated support for SRVCC to the MME 215D, the MME 215D includes a "SRVCC operation possible" indication in an S1 AP Initial Context Setup Request to the eNodeB 205D indicating that both the UE and MME 215D are SRVCC-capable. If the E-UTRAN (operator) (or LTE RAN 120) supports interworking to 3GPP2 1×CS or 3GPP, the E-UTRAN performs the HO trigger, tunnelling of the 3GPP2 1×CS signalling messages toward the MME, and interacting with the SRVCC UE as described in TR 36.938 [7].

The E-UTRAN may be capable of determining the neighbour cell list (NCL) based on the "SRVCC operation possible" indication and/or presence of established QCI='1' bearers for a specific UE. For example, the E-UTRAN may determine the NCL as follows:

If the "SRVCC operation possible" indication is set to "true" (i.e. both Evolved Packet Core (EPC) or LTE core network 140 and UE are SRVCC capable), then:
1. If there is an established QCI='1' bearer for this UE, then 1× cells may be included as candidate target cells in the NCL;
2. If there is no established QCI='1' bearer for this UE, then 1× cells are not included in the NCL;

If the "SRVCC operation possible" indication is set to "false" (i.e. either EPC or UE is not SRVCC capable), then 1× cells are not included in the NCL.

As will be appreciated, if the E-UTRAN does not update the neighbour cell list dynamically and the E-UTRAN triggers handover to 1× when either the "SRVCC operation possible" indication is set to "false" or there are no established QCI='1' bearers for a specific UE, this will result in an error case.

Figure 8:
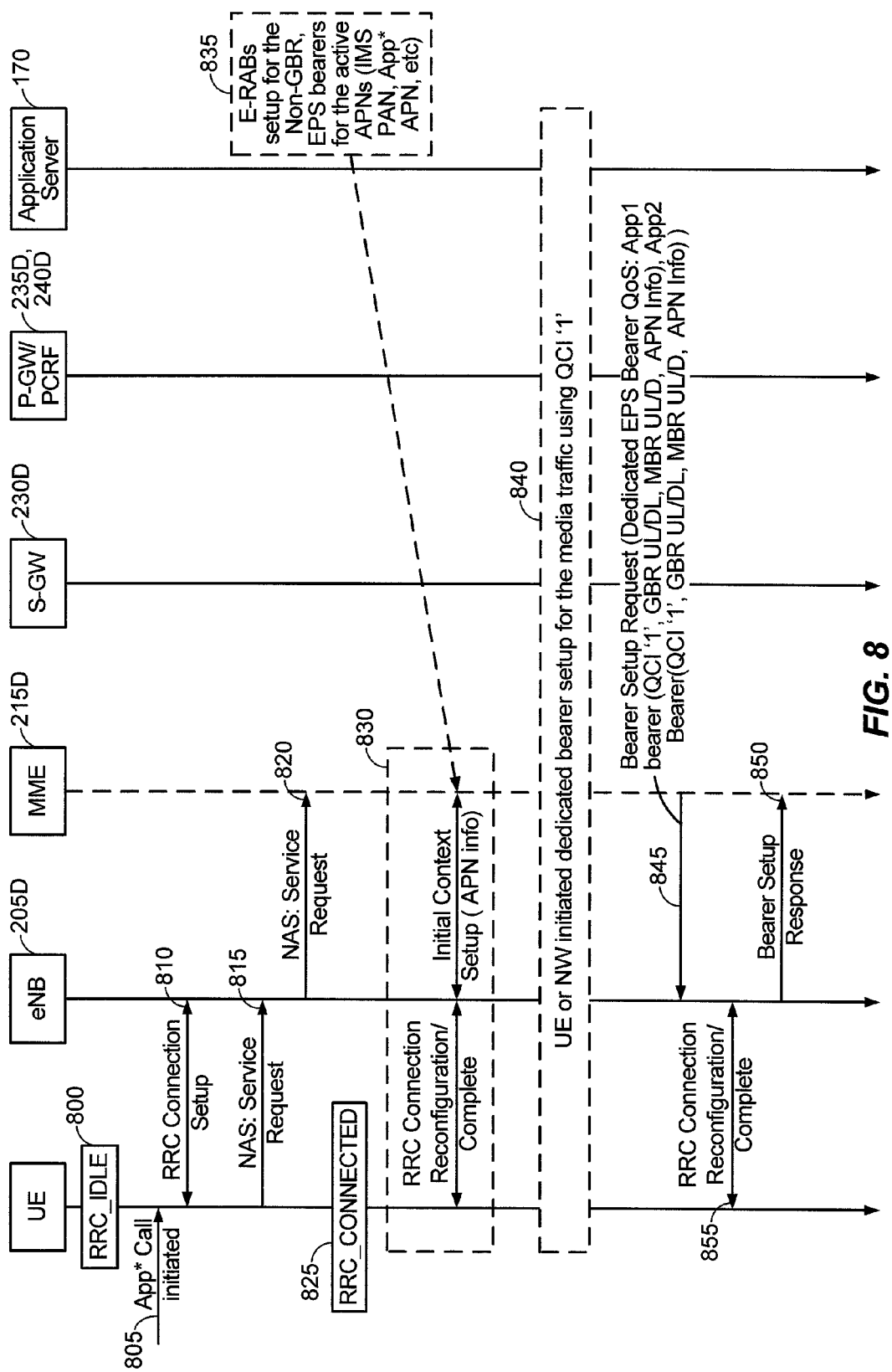
FIG. 8 illustrates a process of notifying an eNodeB of an APN associated with a GBR EPS bearer in accordance with an embodiment of the invention.

FIG. 8 illustrates a process of notifying the eNodeB 205D of an APN associated with a GBR EPS bearer in accordance with an embodiment of the invention. Referring to FIG. 8, the given UE is in RRC-Idle state, 800, when the given UE determines to initiate an App* call, 805 (e.g., in response to receipt of an announce message, in response to a UE request to initiate the App* call, etc.). The given UE transmits a Service Request message to the MME 215D, 815 and 820, and then transitions into RRC-Connected state, 825. During the RRC reconfiguration procedure, 830. During 830, the E-RABs are setup for non-GBR EPS bearers for App* APN, and the MME 215D acquires the APN information for App*, 835. The dedicated GBR EPS bearer is then setup using QCI '1' (or some other QCI, such as $QCI_{App*}$) in a UE-initiated or network-initiated setup mechanism, 840. The MME 215D sends a bearer setup request to the eNodeB 215D that indicates QCI='1' and also indicates the APN information for each bearer (denoted in 840 as App1 and App2), 845. As will be appreciated, the QCI+APN information for App1 and App2 (which may correspond to App* and/or some other application) refers back to the third embodiment (or the QCI+APN embodiment) mentioned earlier. However, the APN information can be conveyed in different ways in other embodiments of the invention, such as via DSCP marking and/or a reserved QCI for the APN as mentioned above. The eNodeB 205D transmits a Bearer Setup Response message to the MME 215, 850, after completion of the RRC state reconfiguration procedure with the given UE, 855.

Figure 9:
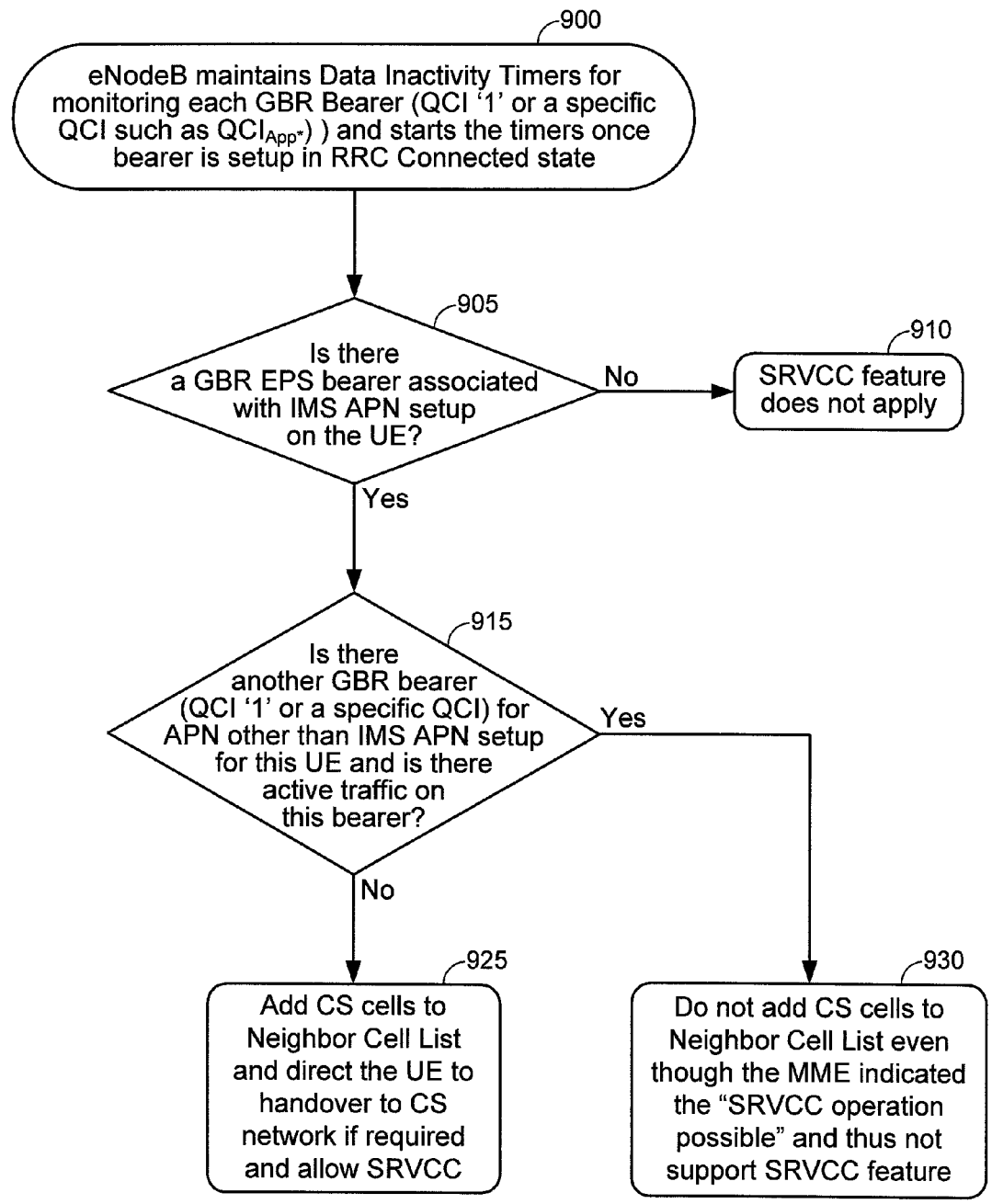
FIG. 9 illustrates operation of the eNodeB 205D in response to the APN information for App* that is conveyed during the process of FIG. 8 in accordance with an embodiment of the present invention.

FIG. 9 illustrates operation of the eNodeB 205D in response to the APN information for App* that is conveyed during the process of FIG. 8 in accordance with an embodiment of the present invention.

Referring to FIG. 9, the eNodeB 205D starts a data inactivity timer for each GBR EPS bearer (e.g., with QCI '1' or with an application-specific QCI such as $QCI_{App*}$) after the respective bearer is established for the given UE in RRC-Connected state, 900. For example, the eNodeB 205D starts the data inactivity timer(s) after 840 of FIG. 8. While not shown in FIG. 9, the eNodeB 205D resets the data inactivity timer(s) when traffic is detected on the respective bearer, such that expiration of the data inactivity timer(s) occurs after a threshold period of traffic inactivity, and expiration of the data inactivity timer(s) triggers teardown of at least air interface resources associated with the respective bearer.

Referring to FIG. 9, the eNodeB determines whether the given UE is allocated a GBR EPS bearer associated with an IMS APN, 905. If not, the SRVCC feature does not apply, 910. If so, the eNodeB 205D determines if there is another GBR EPS bearer (e.g., QCI '1' or $QCI_{App*}$) for a non-IMS APN and if the associated data inactivity timer for that bearer has not yet expired, 915. If not, CS cells are added to the NCL to support handover to CS, 925. If so, CS cells are not added to the NCL even though the MME 215D indicates "SRVCC operation possible" so that the SRVCC feature is not supported, 930. Thus, detection of an active GBR EPS bearer for App* can cause eNodeB 205D to refrain from populating the NCL with CS cells so as to disable SRVCC for App* calls.

When a UE hands off from an LTE network to 3GPP/3GPP2 network (e.g., the eHRPD network of FIG. 2E or the W-CDMA network shown in FIG. 2B or FIG. 2C), the SGSN 220B or HS-GW 220E performs bi-directional mapping of the QoS to provide support for both UE initiated and network initiated bearers. Conventionally, the mapping between LTE QCIs and the EVDO FlowProfileIDs or UMTS Traffic Classes is a static configuration in the SGSN 220B and HS-GW 220E (i.e. a predefined mapping between the QoS parameters is maintained only considering the LTE QCI and not the APN associated with the bearer). However, as discussed earlier, it can be difficult to maintain a static mapping irrespective of the application type or APN associated with the bearer.

Thereby, an embodiment of the invention is directed to maintaining, at the HS-GW 220E and/or SGSN 220B, a mapping for the QoS parameters (FlowProfileIDs supported and the UMTS Traffic class) supported for a particular bearer based on the QCI+APN combination. Thereby, when the H-SGW 220E detects a GBR EPS bearer with a QCI+APN for App* during an LTE-to-eHRPD handoff, the HS-GW 220E can configure the QoS profile IDs for the corresponding QoS flows on the EV-DO network. Likewise, when the SGSN 220B detects an GBR EPS bearer with a QCI+APN for App* during an LTE-to-UMTS (or W-CDMA) handoff, the SGSN 220B can configure the Traffic Class as "Interactive", 'signaling indication –1', Traffic Handling Priority (THP) '1', and/or other App* specific QoS configurations on the UMTS (or W-CDMA) network.

Figure 10:
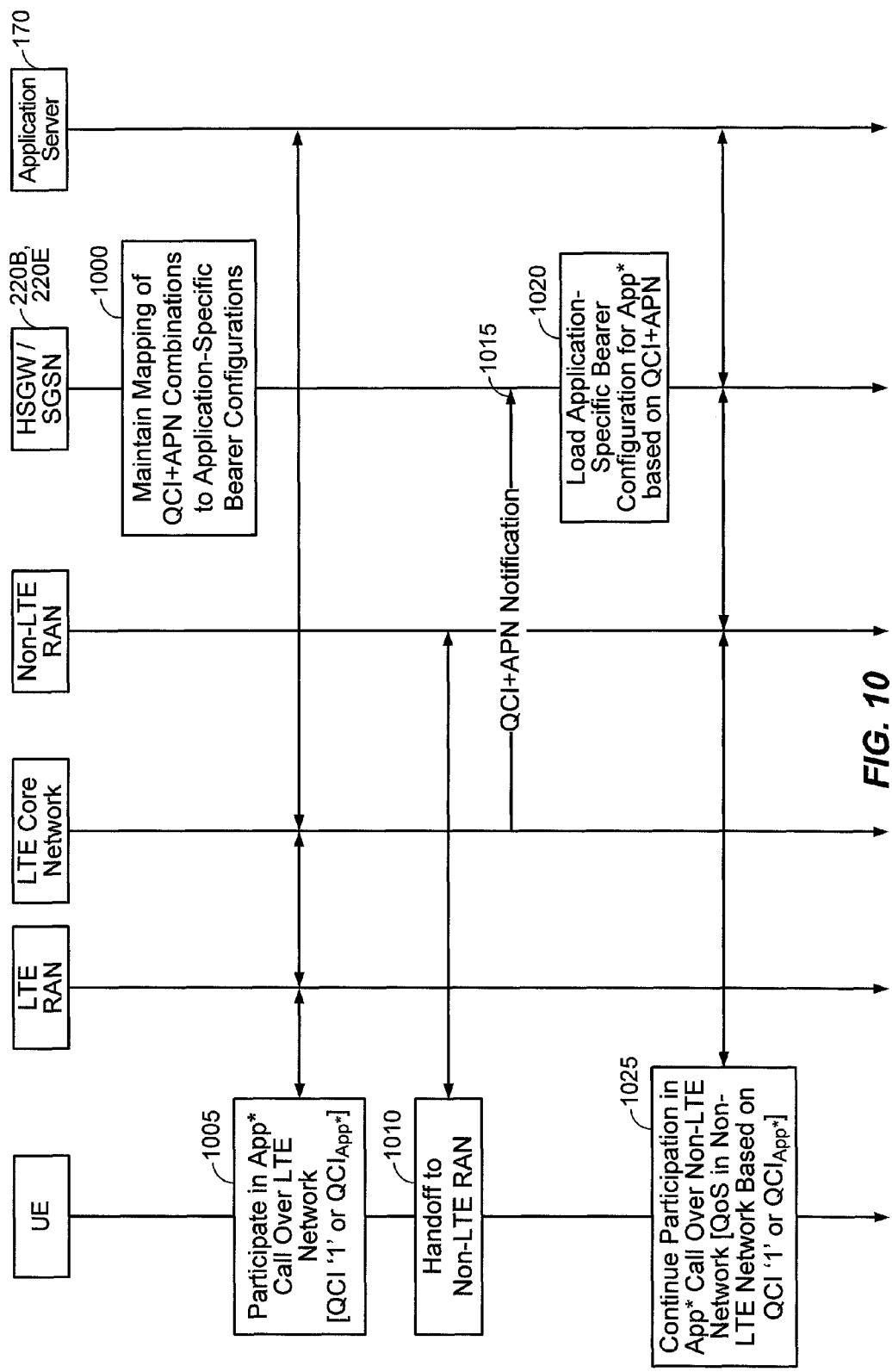
FIG. 10 illustrates a high-level example of the above-noted LTE-to-non-LTE handoff procedure in accordance with an embodiment of the invention.

FIG. 10 illustrates a high-level example of the above-noted LTE-to-non-LTE handoff procedure in accordance with an embodiment of the invention. Referring to FIG. 10, the HS-GW 220E and the SGSN 220B each maintain a mapping of QCI+APN combinations to application-specific bearer configurations in their respective networks, 1000. Thus, when a handoff is made to an eHRPD network associated with the HS-GW 220E or a UMTS network associated with the SGSN 220B for an App* identified by a particular QCI+APN combination, the HS-GW 220E or the SGSN 220B will facilitate the loading of the corresponding application-specific bearer configuration for supporting a bearer after the handoff.

Referring to FIG. 10, a given UE is participating in an App* call being arbitrated by the application server 170 over the LTE network, 1005. At some point during the App*, the given UE hands off from the LTE RAN to a non-LTE RAN (e.g., the UMTS or W-CDMA RAN from FIG. 2B or 2C, the HRPD RAN from FIG. 2E, etc.), 1010. The LTE core network notifies a non-LTE core network component with regard to the QCI+APN that was associated with GBR EPS bearer while the App* call was handled by the LTE network, 1015. For example, the QCI+APN notification of 1015 can be delivered to the HS-GW 220E if the target network is eHRPD, or the SGSN 220B if the target network is UMTS or W-CDMA. The non-LTE core network component loads the application-specific bearer configuration for the App* call based on the QCI+APN using the mapping that was established at 1000, 1020. The given UE then continues its participation in the App* call being arbitrated by the application server 170 over the non-LTE network using the allocated application-specific bearer configuration, 1025. While FIG. 10 is described with respect to the QCI+APN trigger for loading a particular application-specific bearer configuration, it will be appreciated that FIG. 10 could be readily modified so as to be based upon either of the alternative trigger scenarios based upon a reserved QCI (range 128-255) or DSCP marking.

In LTE, a mechanism referred to as CS fallback (CSFB) enables the delivery of CS-domain services (e.g. CS voice) by reuse of the CS infrastructure when the UE is served by E-UTRAN. Whenever a UE originates a voice call (if IMS service on LTE is not available), the UE falls back to CS network for making the voice call over CS network. When an Incoming CS call is received for the UE over CS network, the LTE network forwards the CS Page message to the UE and the UE fallback to CS network for proceeding with the voice call. This is applicable for both single TX and dual Tx/dual Rx devices.

However, in case of Single Tx devices (i.e., UEs with a single antenna for tuning to LTE and non-LTE cellular networks), when a CS Page is received during an active VoIP call on the LTE network, the UE tunes away from the LTE network to attach to the CS network, respond to the page and setup the session over CS network. This interrupts the ongoing VoIP call on LTE. Further, in case of Dual Tx/Dual Rx devices, the UE can listen to both LTE and CS networks and support sessions simultaneously on the same network. However, for sessions using digital signal processing (DSP) resources for codec frame generation, only one session can be supported regardless of the RF support for multiple technologies. Thus, whenever a CS call is supported, the VoIP call on LTE would be interrupted. As will be appreciated, a user of the UE may prefer to not be interrupted by incoming CS voice calls when the UE is already engaged in a voice (VoIP) call over LTE network for both single Tx and Dual Tx devices.

Accordingly, as discussed below with respect to FIGS. 11A-11B, an embodiment of the invention is directed to preventing interruption of App* calls on LTE due to incoming CS call pages.

Figure 11A:
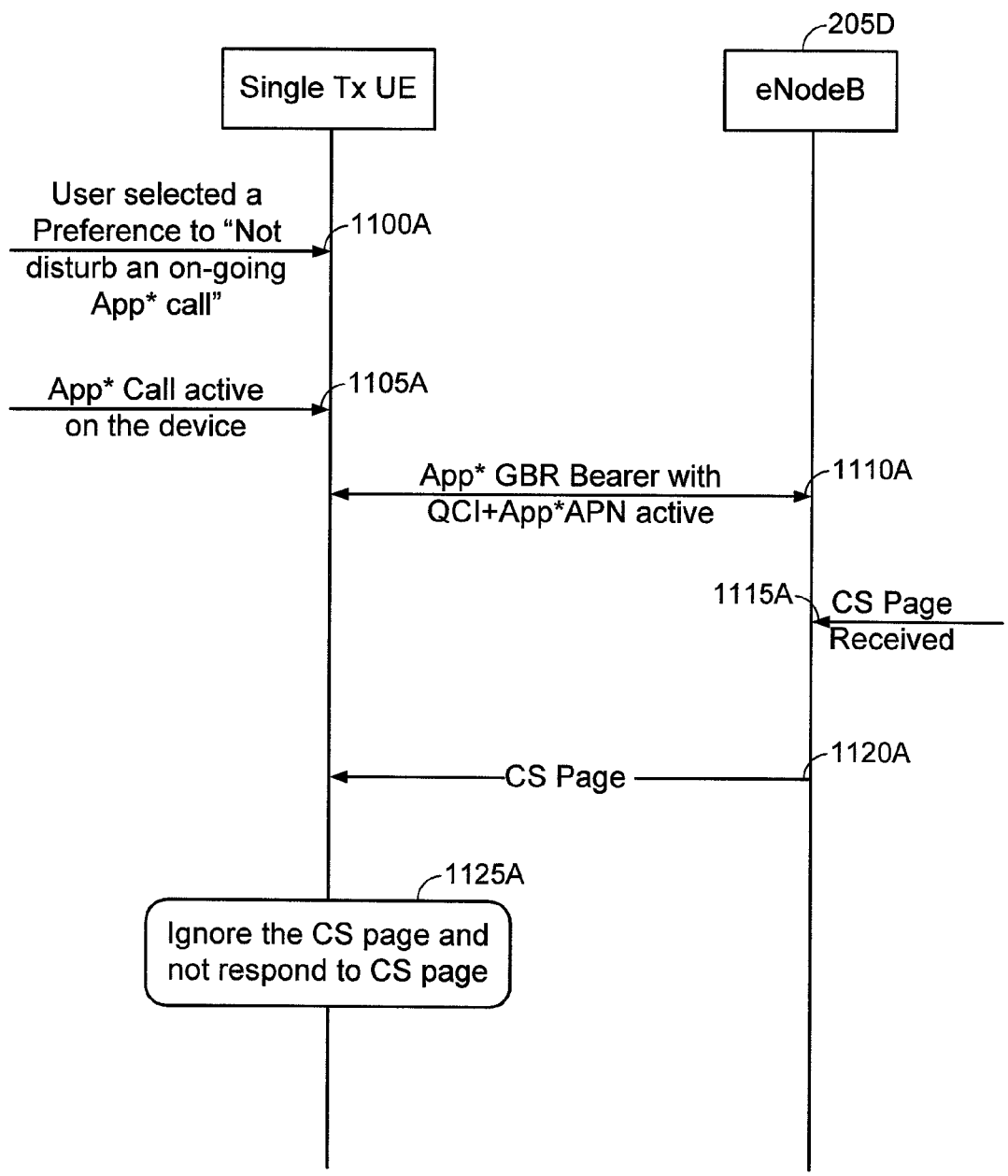
FIG. 11A is directed to a UE-side process preventing interruption of calls on an LTE network due to incoming CS call pages for a single Tx UE in accordance with an embodiment of the invention.

Referring to FIG. 11A, a user of a single Tx UE indicates a preference to not be disturbed during an on-going App* call, 1100A. At 1105A, the single Tx UE is actively engaged in an App* call over the LTE network via serving Node B 205D, and the eNodeB 205D allocates an App* GBR EPS bearer to the single TX UE for supporting the App* call, 1110A. During the App* call, the eNodeB 205D receives a CS page for the single Tx UE, 1115A, and the eNodeB 205D transmits the CS page to the single Tx UE, 1120A. However, because the user of the single Tx UE indicated his/her preference for not interrupting App* calls, the CS page is ignored and the single Tx UE does not respond to the CS page, 1125A.

Figure 11B:
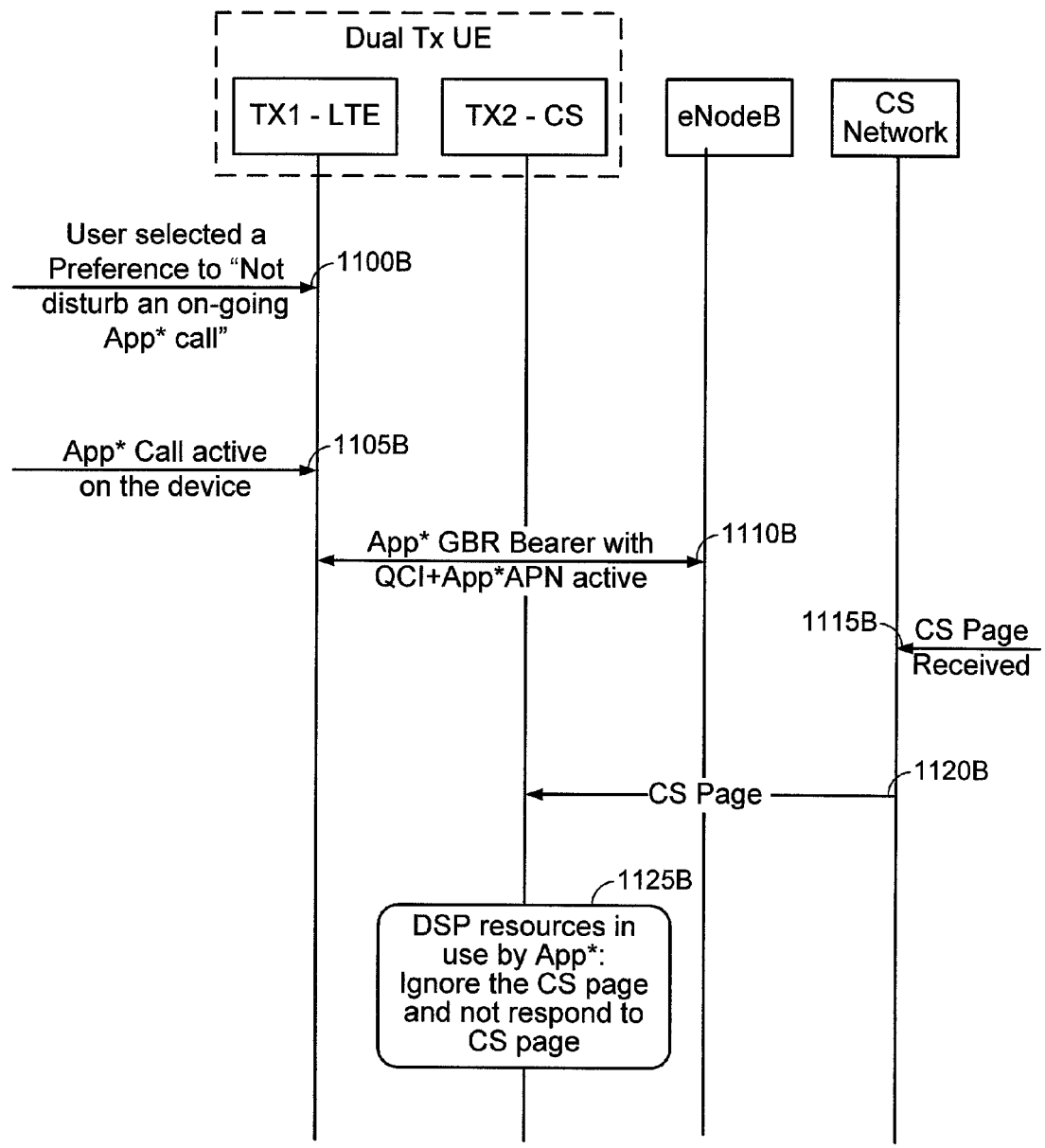
FIG. 11B is directed to a UE-side process preventing interruption of calls on an LTE network due to incoming CS call pages for a dual Tx UE in accordance with an embodiment of the invention.

Referring to FIG. 11B, a user of a dual Tx UE equipped with a first TX ("TX1") tuned to the LTE network and a second TX ("TX2") tuned to the CS network indicates a preference to not be disturbed during an on-going App* call over LTE, 1100B. At 1105B, the dual Tx UE is actively engaged in an App* call using TX1 over the LTE network via serving Node B 205D, and the eNodeB 205D allocates an App* GBR EPS bearer to the dual Tx UE for supporting the App* call, 1110B. During the App* call, the CS network receives a CS page for the dual Tx UE, 1115b, and the CS network transmits the CS page to the dual Tx UE, 1120B. However, because the user of the dual Tx UE indicated his/her preference for not interrupting App* calls, TX2 determines that DSP resources are already being used by App* for the App* call over TX1, and the CS page is ignored and the dual Tx UE does not respond to the CS page, 1125B.

Figure 12:
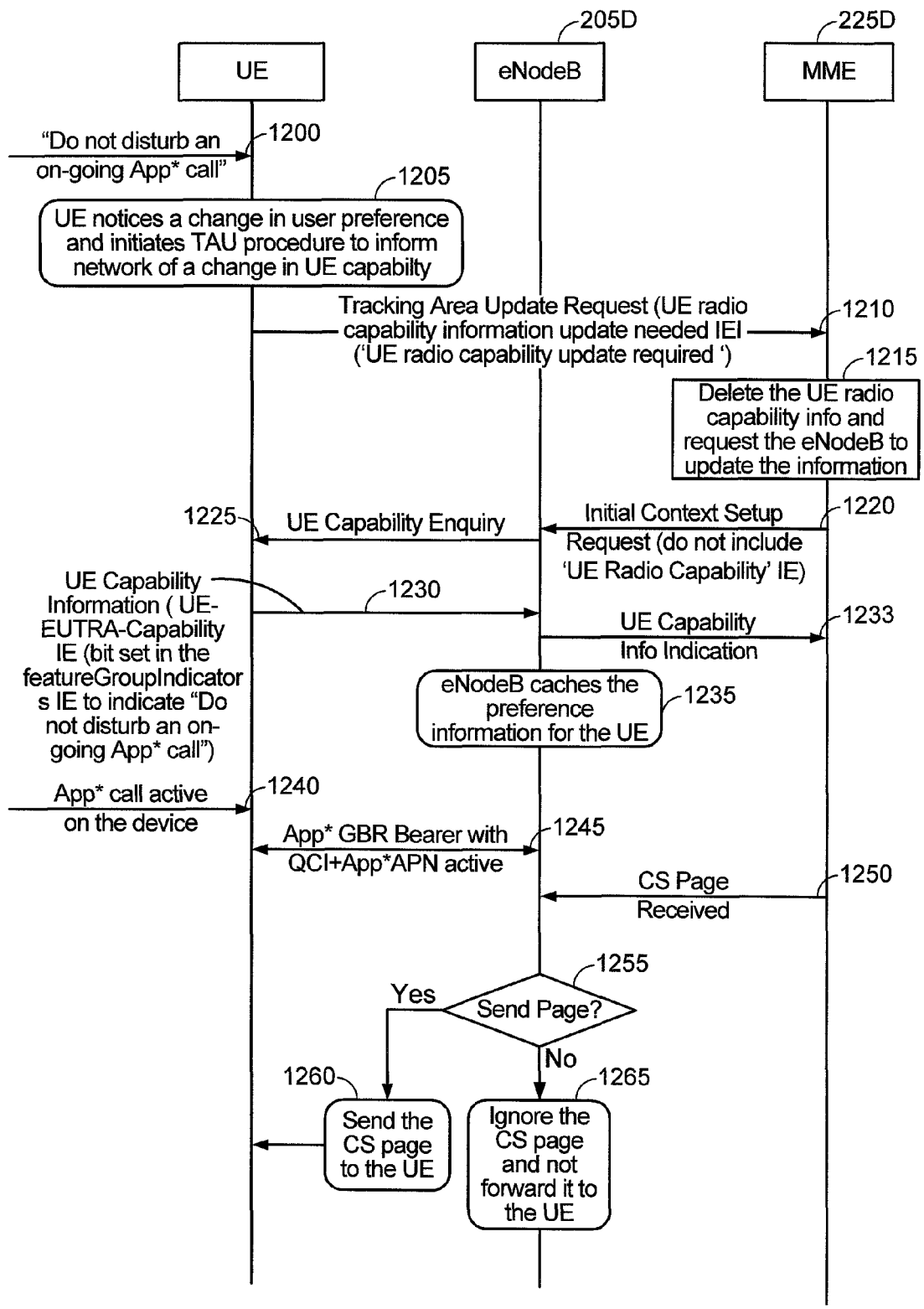
FIG. 12 is directed to a network-side process preventing interruption of calls on an LTE network due to incoming CS call pages in accordance with an embodiment of the invention.
Figure 13:
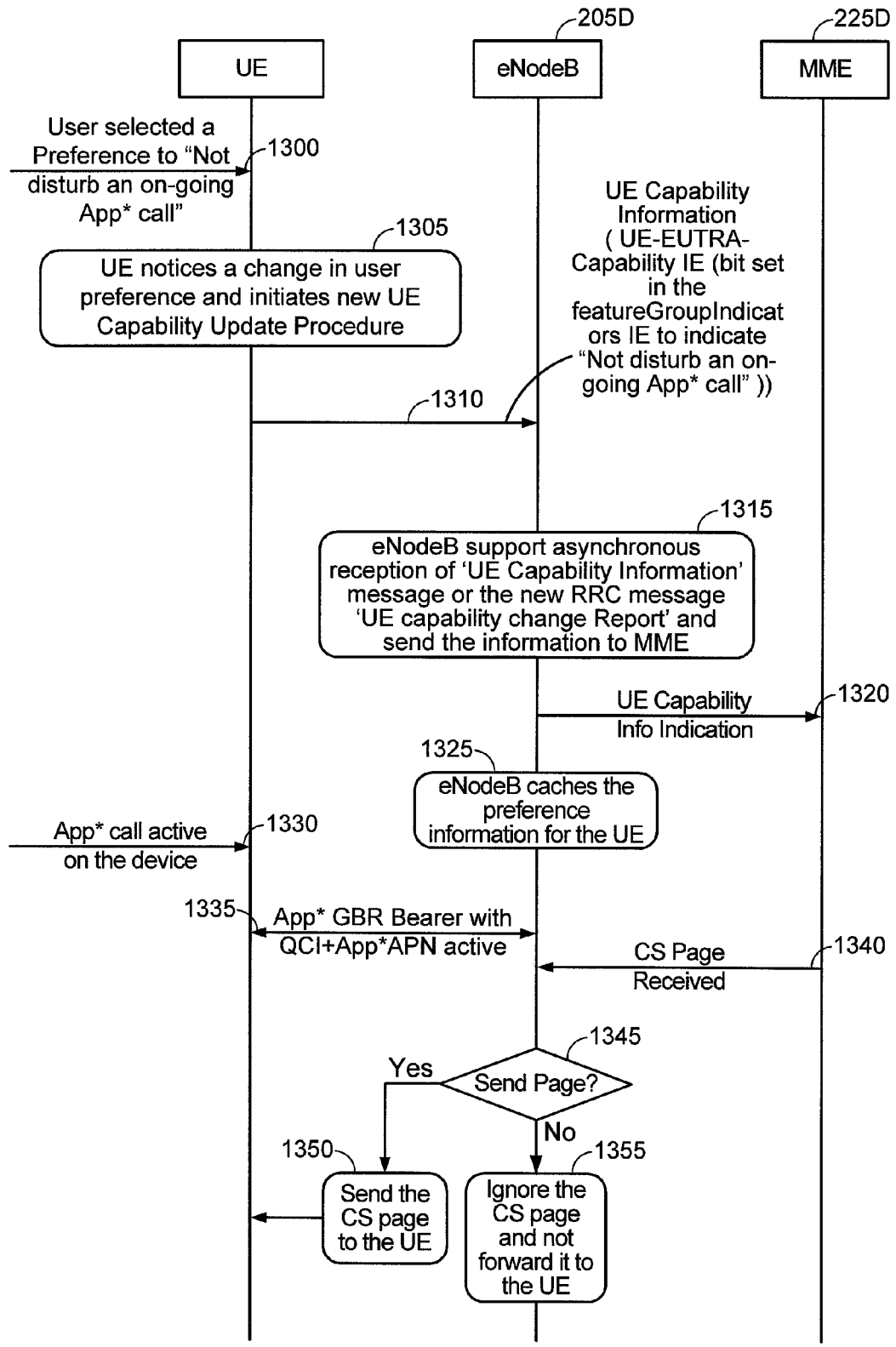
FIG. 13 another is directed to a network-side process preventing interruption of calls on an LTE network due to incoming CS call pages in accordance with an embodiment of the invention.

FIGS. 11A-11B are directed to UE-side solutions in the sense that the CS pages are transmitted to the target UE in FIGS. 11A-11B, and the target UE manages its user preferences to determine whether the CS page(s) are to be ignored during an active App* call over LTE. FIGS. 12-13 are directed to network-side solutions related to selective interruption of App* calls over LTE when a CS page is available for transmission to the target UE.

In LTE, UEs report their respective UE capability information during an Attach procedure, and, explicitly when requested by eNodeB via UE capability Enquiry (e.g., see 5.6.3 of 36.331 V9.6.0). UEs can also send Tracking Area Update procedure to update any change in the UE Capability Information (Reference Section 5.3.3 of 3GPP TS 23.401 v9.11.0). Section 5.11 of 23.401 v9.11.0 specifies that if a given UE is performing an Attach procedure or a Tracking Area Update (TAU) procedure for the "first TAU following GERAN/UTRAN Attach" or for "UE radio capability update", the MME shall delete (or mark as deleted) any UE Radio Capability information that it has stored, and, if the MME sends an S1 interface INITIAL CONTEXT SETUP REQUEST message during that procedure, the MME shall not send any UE Radio Capability information to the E-UTRAN in that message. This triggers the E-UTRAN to request the UE Radio Capability from the UE and upload it to the MME in the S1 interface UE CAPABILITY INFO INDICATION message. The eNodeB updates the MME on the UE capabilities via the UE CAPABILITY INFO INDICATION, 3GPP TS 36.413 v9.7.0 section 9.1.10. With this in mind, FIG. 12 a network-side solution that operates within the LTE standard as explained in this paragraph, whereas FIG. 13 is directed to a network-side solution that relies upon modifications to the LTE standard as explained in this paragraph.

Referring to FIG. 12, a user of a given UE (e.g., a single Tx UE or a dual Tx UE) indicates a preference to not be disturbed during an on-going App* call over LTE, 1200. The given UE registers its users no-disturbance preference, 1205, and the given UE transmits a Tracking Area Update Request message to the MME 215D via the eNodeB 205D to prompt the MME 215D to initiate a UE radio capability update procedure, 1210. The MME 215D deletes the given UE's radio capability information and requests that the eNodeB 205D update the information, 1215. Accordingly, the MME 215D sends an initial context setup request message to the eNodeB 205D without including a UE radio capability IE, 1220, which prompts the eNodeB 205D to send a UE capability enquiry to the given UE 1225. The given UE responds to the UE capability enquiry with UE capability information that sets a Reserved bit (range 30-32) in the featureGroupIndicators IE of the UE-EUTRA-Capability IE (defined at section 5.6.3 of 36.331 V9.6.0), 1230. The UE capability information message from 1230 being configured in this manner functions to notify the eNodeB 205D of the given UE's no-disturbance preference. The eNodeB 205D forwards the UE capability information to the MME 215D, 1230, and also caches the no-disturbance preference for the given UE, 1235.

Referring to FIG. 12, the given UE begins an App* call at 1240, and is assigned an App* GBR EPS bearer based on QCI+App*APN, 1245. During the App* call, the eNodeB 205D receives a CS page for transmission to the given UE, 1250. Because the eNodeB 205D is aware of the active GBR EPS Bearer for App*, the eNodeB 205D determines whether to send the CS page to the given UE based on the UE's cached preference from 1235. If the cached preference indicates that App* calls can be disturbed, the CS page is transmitted at 1260. Otherwise, if the cached preference indicates a no-disturbance preference for App* calls, the CS page is ignored (not transmitted to the given UE), 1265.

FIG. 13 is similar to FIG. 12, except that FIG. 13 relies upon a different mechanism by which the given UE reports its call disturbance preferences to the network. In FIG. 13, the LTE standard is assumed to be updated to support an asynchronous transmission of 'UE Capability Information' message to update the capability or preference change by the UE, and, eNodeB support for reception of this message and forwarding the info to MME 215D. By contrast, in FIG. 12, the given UE sent a Tracking Area Update Request message to the MME 215D in order to work within the existing LTE standard because the MME 215D is responsible for initiating UE capability information update procedures in the existing LTE standard. Also, in FIG. 13, the LTE standard is assumed to be updated to support a new RRC message 'UE capability change Report' to update the capability or preference change by the UE, and, eNodeB support for reception of this message and forwarding the info to MME.

Referring to FIG. 13, a user of a given UE (e.g., a single Tx UE or a dual Tx UE) indicates a preference to not be disturbed during an on-going App* call over LTE, 1300. The given UE registers its users no-disturbance preference, 1305, and the given UE transmits the new asynchronous 'UE Capability Information' message to the eNodeB 205D, 1310. The eNodeB 205D is configured to support asynchronous reception of the UE Capability Information message, 1315, and forwards the UE capability information to the MME 215D, 1320. The eNodeB 205D caches the no-disturbance preference for the given UE, 1325. 1330 through 1355 of FIG. 13 substantially correspond to 1240 through 1265 of FIG. 12, respectively, and will not be described further for the sake of brevity.

While the embodiments above have been described primarily with reference to 1xEV-DO architecture in CDMA2000 networks, GPRS architecture in W-CDMA or UMTS networks and/or EPS architecture in LTE-based networks, it will be appreciated that other embodiments can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of handing off a session from a first network of a first type to a second network of a second type, comprising:
   supporting, by the first network for a client device, a non-Internet Protocol (IP) Multimedia Subsystem (IMS) session on a first Quality of Service (QoS) link associated with a first application-specific QoS link configuration, the first application-specific QoS link configuration configured to be used by the first network for supporting non-IMS sessions associated with an application of a given type;
   detecting a handoff of the non-IMS session from the first network to the second network; and
   notifying the second network with regard to application-identifying information that identifies the application of the given type that is associated with the non-IMS session to trigger setup, by the second network, of a second QoS link associated with a second application-specific QoS link configuration for supporting the non-IMS session for the client device, the application-identifying information configured to be directly mapped to the second application-specific QoS link configuration, the second application-specific QoS link configuration configured to be used by the second network for supporting non-IMS sessions associated with the application of the given type.

2. The method of claim 1, wherein the first type is Long Term Evolution (LTE) and the second type is non-LTE.

3. The method of claim 2,
   wherein the second type is High Rate Packet Data (HRPD),
   wherein the notifying includes:
   transmitting a signal including the application-identifying information from an LTE core network to an HRPD serving gateway (HS-GW) of the second network.

4. The method of claim 2,
   wherein the second type is Universal Mobile Telecommunications System (UMTS) or Wideband-Code Division Multiple Access (W-CDMA),
   wherein the notifying includes:
   transmitting a signal including the application-identifying information from an LTE core network to a Serving General Packet Radio Service (GPRS) Support Node (SGSN) of the second network.

5. The method of claim 1, wherein the application-identifying information includes an identification of a QoS Class Identifier (QCI) that is reserved exclusively for the application of the given type.

6. The method of claim 5,
   wherein the first network is a Long Term Evolution (LTE) network operating in accordance with an LTE protocol,
   wherein the reserved QCI is between 128-255 of an associated QCI range in accordance with the LTE protocol.

7. The method of claim 1, wherein the application-identifying information includes Differentiated Services Code Point (DSCP) marking that uniquely identifies the application of the given type.

8. The method of claim 1, wherein the application-identifying information includes a combination of a QoS Class Identifier (QCI) and Access Point Name (APN) that collectively function to uniquely identify the application of the given type.

9. A method of handing off a session from a first network of a first type to a second network of a second type, comprising:
   maintaining, by the second network, a table that maps application-identifying information for one or more non-Internet Protocol (IP) Multimedia Subsystem (IMS) applications directly to one or more application-specific Quality of Service (QoS) link configurations, each of the one or more application-specific QoS link configurations being configured to be used by the second network for supporting client devices engaged in non-IMS sessions associated with a given application of a given type;
   detecting a handoff of a non-IMS session for a client device from the first network to the second network; and
   receiving, from the first network in conjunction with the handoff of the non-IMS session from the first network to the second network, application-identifying information that identifies a non-IMS application associated with the non-IMS session; and
   setting up, at the second network in conjunction with the handoff, a second QoS link for the client device to support the non-IMS session based on a given application-specific QoS link configuration that is directly mapped to the received application-identifying information in the table.

10. The method of claim 9, wherein the first type is Long Term Evolution (LTE) and the second type is non-LTE.

11. The method of claim 10,
    wherein the second type is High Rate Packet Data (HRPD),
    wherein the receiving receives a signal including the application-identifying information from an LTE core network at an HRPD serving gateway (HS-GW) of the second network.

12. The method of claim 10,
    wherein the second type is Universal Mobile Telecommunications System (UMTS) or Wideband-Code Division Multiple Access (W-CDMA),
    wherein the receiving receives a signal including the application-identifying information from an LTE core network to at a Serving General Packet Radio Service (GPRS) Support Node (SGSN) of the second network.

13. The method of claim 9,
    wherein the application-identifying information includes an identification of a QoS Class Identifier (QCI) that is reserved exclusively for the application of the given type.

14. The method of claim 13,
    wherein the first network is a Long Term Evolution (LTE) network operating in accordance with an LTE protocol,
    wherein the reserved QCI is between 128-255 of an associated QCI range in accordance with the LTE protocol.

15. The method of claim 9, wherein the application-identifying information includes Differentiated Services Code Point (DSCP) marking that uniquely identifies the application of the given type.

16. The method of claim 9, wherein the application-identifying information includes a combination of a QoS Class Identifier (QCI) and Access Point Name (APN) that collectively function to uniquely identify the application of the given type.

17. A first network of a first type that is configured to facilitate a handoff of a session to a second network of a second type, comprising:
    means for supporting, for a client device, a non-Internet Protocol (IP) Multimedia Subsystem (IMS) session on a first Quality of Service (QoS) link associated with a first application-specific QoS link configuration, the first application-specific QoS link configuration configured to be used by the first network for supporting non-IMS sessions associated with an application of a given type;
means for detecting a handoff of the non-IMS session from the first network to the second network; and
means for notifying the second network with regard to application-identifying information that identifies the application of the given type that is associated with the non-IMS session to trigger setup, by the second network, of a second QoS link associated with a second application-specific QoS link configuration for supporting the non-IMS session for the client device, the application-identifying information configured to be directly mapped to the second application-specific QoS link configuration, the second application-specific QoS link configuration configured to be used by the second network for supporting non-IMS sessions associated with the application of the given type.

18. The first network of claim 17, wherein the first type is Long Term Evolution (LTE) and the second type is non-LTE.

19. The first network of claim 18,
wherein the second type is High Rate Packet Data (HRPD),
wherein the means for notifying transmits a signal including the application-identifying information from an LTE core network to an HRPD serving gateway (HS-GW) of the second network.

20. The first network of claim 18,
wherein the second type is Universal Mobile Telecommunications System (UMTS) or Wideband-Code Division Multiple Access (W-CDMA),
wherein the means for notifying transmits a signal including the application-identifying information from an LTE core network to a Serving General Packet Radio Service (GPRS) Support Node (SGSN) of the second network.

21. The first network of claim 17,
wherein the application-identifying information includes an identification of a QoS Class Identifier (QCI) that is reserved exclusively for the application of the given type, or
wherein the application-identifying information includes Differentiated Services Code Point (DSCP) marking that uniquely identifies the application of the given type, or
wherein the application-identifying information includes a combination of a QoS Class Identifier (QCI) and Access Point Name (APN) that collectively function to uniquely identify the application of the given type.

22. A second network of a second type that is configured to facilitate a handoff of a session from a first network of a first type, comprising:
means for maintaining a table that maps application-identifying information for one or more non-Internet Protocol (IP) Multimedia Subsystem (IMS) applications directly to one or more application-specific Quality of Service (QoS) link configurations, each of the one or more application-specific QoS link configurations being configured to be used by the second network for supporting client devices engaged in non-IMS sessions associated with a given application of a given type;
means for detecting a handoff of a non-IMS session for a client device from the first network to the second network; and
means for receiving, from the first network in conjunction with the handoff of the non-IMS session from the first network to the second network, application-identifying information that identifies a non-IMS application associated with the non-IMS session; and
means for setting up, at the second network in conjunction with the handoff, a second QoS link for the client device to support the non-IMS session based on a given application-specific QoS link configuration that is directly mapped to the received application-identifying information in the table.

23. The second network of claim 22, wherein the first type is Long Term Evolution (LTE) and the second type is non-LTE.

24. The second network of claim 23,
wherein the second type is High Rate Packet Data (HRPD),
wherein the means for receiving receives a signal including the application-identifying information from an LTE core network at an HRPD serving gateway (HS-GW) of the second network.

25. The second network of claim 23,
wherein the second type is Universal Mobile Telecommunications System (UMTS) or Wideband-Code Division Multiple Access (W-CDMA),
wherein the means for receiving receives a signal including the application-identifying information from an LTE core network to at a Serving General Packet Radio Service (GPRS) Support Node (SGSN) of the second network.

26. The second network of claim 22,
wherein the application-identifying information includes an identification of a QoS Class Identifier (QCI) that is reserved exclusively for the application of the given type, or
wherein the application-identifying information includes Differentiated Services Code Point (DSCP) marking that uniquely identifies the application of the given type, or
wherein the application-identifying information includes a combination of a QoS Class Identifier (QCI) and Access Point Name (APN) that collectively function to uniquely identify the application of the given type.

27. A first network of a first type that is configured to facilitate a handoff of a session to a second network of a second type, comprising:
logic configured to support, for a client device, a non-Internet Protocol (IP) Multimedia Subsystem (IMS) session on a first Quality of Service (QoS) link associated with a first application-specific QoS link configuration, the first application-specific QoS link configuration configured to be used by the first network for supporting non-IMS sessions associated with an application of a given type;
logic configured to detect a handoff of the non-IMS session from the first network to the second network; and
logic configured to notify the second network with regard to application-identifying information that identifies the application of the given type that is associated with the non-IMS session to trigger setup, by the second network, of a second QoS link associated with a second application-specific QoS link configuration for supporting the non-IMS session for the client device, the application-identifying information configured to be directly mapped to the second application-specific QoS link configuration, the second application-specific QoS link configuration configured to be used by the second network for supporting non-IMS sessions associated with the application of the given type.

28. The first network of claim 27, wherein the first type is Long Term Evolution (LTE) and the second type is non-LTE.

29. The first network of claim 28,
wherein the second type is High Rate Packet Data (HRPD),
wherein the logic configured to notify transmits a signal including the application-identifying information from an LTE core network to an HRPD serving gateway (HS-GW) of the second network.

30. The first network of claim 28,
wherein the second type is Universal Mobile Telecommunications System (UMTS) or Wideband-Code Division Multiple Access (W-CDMA),
wherein the logic configured to notify transmits a signal including the application-identifying information from an LTE core network to a Serving General Packet Radio Service (GPRS) Support Node (SGSN) of the second network.

31. The first network of claim 27, wherein the application-identifying information includes an identification of a QoS Class Identifier (QCI) that is reserved exclusively for the application of the given type.

32. The first network of claim 31,
wherein the first network is a Long Term Evolution (LTE) network operating in accordance with an LTE protocol,
wherein the reserved QCI is between 128-255 of an associated QCI range in accordance with the LTE protocol.

33. The first network of claim 27,
wherein the application-identifying information includes Differentiated Services Code Point (DSCP) marking that uniquely identifies the application of the given type, or
wherein the application-identifying information includes a combination of a QoS Class Identifier (QCI) and Access Point Name (APN) that collectively function to uniquely identify the application of the given type.

34. A second network of a second type that is configured to facilitate a handoff of a session from a first network of a first type, comprising:
logic configured to maintain a table that maps application-identifying information for one or more non-Internet Protocol (IP) Multimedia Subsystem (IMS) applications directly to one or more application-specific Quality of Service (QoS) link configurations, each of the one or more application-specific QoS link configurations being configured to be used by the second network for supporting client devices engaged in non-IMS sessions associated with a given application of a given type;
logic configured to detect a handoff of a non-IMS session for a client device from the first network to the second network; and
logic configured to receive, from the first network in conjunction with the handoff of the non-IMS session from the first network to the second network, application-identifying information that identifies a non-IMS application associated with the non-IMS session; and
logic configured to set up, at the second network in conjunction with the handoff, a second QoS link for the client device to support the non-IMS session based on a given application-specific QoS link configuration that is directly mapped to the received application-identifying information in the table.

35. The second network of claim 24, wherein the first type is Long Term Evolution (LTE) and the second type is non-LTE.

36. The second network of claim 35,
wherein the second type is High Rate Packet Data (HRPD),
wherein the logic configured to receive receives a signal including the application-identifying information from an LTE core network at an HRPD serving gateway (HS-GW) of the second network.

37. The second network of claim 35,
wherein the second type is Universal Mobile Telecommunications System (UMTS) or Wideband-Code Division Multiple Access (W-CDMA),
wherein the logic configured to receive receives a signal including the application-identifying information from an LTE core network to at a Serving General Packet Radio Service (GPRS) Support Node (SGSN) of the second network.

38. The second network of claim 34,
wherein the application-identifying information includes an identification of a QoS Class Identifier (QCI) that is reserved exclusively for the application of the given type.

39. The second network of claim 38,
wherein the first network is a Long Term Evolution (LTE) network operating in accordance with an LTE protocol,
wherein the reserved QCI is between 128-255 of an associated QCI range in accordance with the LTE protocol.

40. The second network of claim 34,
wherein the application-identifying information includes Differentiated Services Code Point (DSCP) marking that uniquely identifies the application of the given type, or
wherein the application-identifying information includes a combination of a QoS Class Identifier (QCI) and Access Point Name (APN) that collectively function to uniquely identify the application of the given type.

41. A non-transitory computer-readable medium containing instructions stored thereon, which, when executed by a first network of a first type that is configured to facilitate a handoff of a session to a second network of a second type, cause the first network to perform operations, the instructions comprising:
at least one instruction configured to cause the first network to support, for a client device, a non-Internet Protocol (IP) Multimedia Subsystem (IMS) session on a first Quality of Service (QoS) link associated with a first application-specific QoS link configuration, the first application-specific QoS link configuration configured to be used by the first network for supporting non-IMS sessions associated with an application of a given type;
at least one instruction configured to cause the first network to detect a handoff of the non-IMS session from the first network to the second network; and
at least one instruction configured to cause the first network to notify the second network with regard to application-identifying information that identifies the application of the given type that is associated with the non-IMS session to trigger setup, by the second network, of a second QoS link associated with a second application-specific QoS link configuration for supporting the non-IMS session for the client device, the application-identifying information configured to be directly mapped to the second application-specific QoS link configuration, the second application-specific QoS link configuration configured to be used by the second network for supporting non-IMS sessions associated with the application of the given type.

42. The non-transitory computer-readable medium of claim 41, wherein the first type is Long Term Evolution (LTE) and the second type is non-LTE.

43. The non-transitory computer-readable medium of claim 42,
  wherein the second type is High Rate Packet Data (HRPD),
  wherein the at least one instruction configured to cause the first network to notify causes the first network to transmit a signal including the application-identifying information from an LTE core network to an HRPD serving gateway (HS-GW) of the second network.

44. The non-transitory computer-readable medium of claim 42,
  wherein the second type is Universal Mobile Telecommunications System (UMTS) or Wideband-Code Division Multiple Access (W-CDMA),
  wherein the at least one instruction configured to cause the first network to notify causes the first network to transmit a signal including the application-identifying information from an LTE core network to a Serving General Packet Radio Service (GPRS) Support Node (SGSN) of the second network.

45. The non-transitory computer-readable medium of claim 41,
  wherein the application-identifying information includes an identification of a QoS Class Identifier (QCI) that is reserved exclusively for the application of the given type, or
  wherein the application-identifying information includes Differentiated Services Code Point (DSCP) marking that uniquely identifies the application of the given type, or
  wherein the application-identifying information includes a combination of a QoS Class Identifier (QCI) and Access Point Name (APN) that collectively function to uniquely identify the application of the given type.

46. A non-transitory computer-readable medium containing instructions stored thereon, which, when executed by a second network of a second type that is configured to facilitate a handoff of a session from a first network of a first type, cause the second network to perform operations, the instructions comprising:
  at least one instruction configured to cause the second network to maintain a table that maps application-identifying information for one or more non-Internet Protocol (IP) Multimedia Subsystem (IMS) applications directly to one or more application-specific Quality of Service (QoS) link configurations, each of the one or more application-specific QoS link configurations being configured to be used by the second network for supporting client devices engaged in non-IMS sessions associated with a given application of a given type;
  at least one instruction configured to cause the second network to detect a handoff of a non-IMS session for a client device from the first network to the second network; and
  at least one instruction configured to cause the second network to receive, from the first network in conjunction with the handoff of the non-IMS session from the first network to the second network, application-identifying information that identifies a non-IMS application associated with the non-IMS session; and
  at least one instruction configured to cause the second network to set up, at the second network in conjunction with the handoff, a second QoS link for the client device to support the non-IMS session based on a given application-specific QoS link configuration that is directly mapped to the received application-identifying information in the table.

47. The non-transitory computer-readable medium of claim 41, wherein the first type is Long Term Evolution (LTE) and the second type is non-LTE.

48. The non-transitory computer-readable medium of claim 47,
  wherein the second type is High Rate Packet Data (HRPD),
  wherein the at least one instruction configured to cause the second network to receive causes the first network to receive a signal including the application-identifying information from an LTE core network at an HRPD serving gateway (HS-GW) of the second network.

49. The non-transitory computer-readable medium of claim 47,
  wherein the second type is Universal Mobile Telecommunications System (UMTS) or Wideband-Code Division Multiple Access (W-CDMA),
  wherein the at least one instruction configured to cause the second network to receive causes the first network to receive a signal including the application-identifying information from an LTE core network to at a Serving General Packet Radio Service (GPRS) Support Node (SGSN) of the second network.

50. The non-transitory computer-readable medium of claim 46,
  wherein the application-identifying information includes an identification of a QoS Class Identifier (QCI) that is reserved exclusively for the application of the given type, or
  wherein the application-identifying information includes Differentiated Services Code Point (DSCP) marking that uniquely identifies the application of the given type, or
  wherein the application-identifying information includes a combination of a QoS Class Identifier (QCI) and Access Point Name (APN) that collectively function to uniquely identify the application of the given type.

\* \* \* \* \*